United States Patent
Nakagawa

(10) Patent No.: US 8,670,090 B2
(45) Date of Patent: Mar. 11, 2014

(54) LIQUID CRYSTAL DISPLAY DEVICE AND PRODUCTION METHOD THEREOF

(75) Inventor: Hidetoshi Nakagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 801 days.

(21) Appl. No.: 12/677,340

(22) PCT Filed: May 1, 2008

(86) PCT No.: PCT/JP2008/058362
§ 371 (c)(1),
(2), (4) Date: Mar. 10, 2010

(87) PCT Pub. No.: WO2009/037889
PCT Pub. Date: Mar. 26, 2009

(65) Prior Publication Data
US 2010/0188623 A1    Jul. 29, 2010

(30) Foreign Application Priority Data
Sep. 21, 2007  (JP) ................... 2007-245732

(51) Int. Cl.
*G02F 1/1333*  (2006.01)
(52) U.S. Cl.
USPC .......................................................... 349/94
(58) Field of Classification Search
USPC .......................................................... 349/94
See application file for complete search history.

(56) References Cited

U.S. PATENT DOCUMENTS

| | | | |
|---|---|---|---|
| 6,975,377 B2 | 12/2005 | Hsu | |
| 2005/0151903 A1 | 7/2005 | Okumura | |
| 2008/0129941 A1 | 6/2008 | Okumura | |
| 2010/0225864 A1* | 9/2010 | Inoue et al. | 349/123 |

FOREIGN PATENT DOCUMENTS

| | | |
|---|---|---|
| CN | 1641444 | 7/2005 |
| JP | 2-110431 | 4/1990 |
| JP | 3-267919 | 11/1991 |
| JP | 2893818 | 3/1999 |
| JP | 2001-249352 | 9/2001 |
| JP | 2002-148625 | 5/2002 |

OTHER PUBLICATIONS

International Search Report for PCT/JP2008/058362, mailed Aug. 5, 2008.

* cited by examiner

*Primary Examiner* — Timothy L Rude
(74) *Attorney, Agent, or Firm* — Nixon & Vanderhye P.C.

(57) ABSTRACT

The present invention provides a liquid crystal display device capable of improving display qualities in a frame region and a production method thereof. The present invention is a liquid crystal display device including:
first and second substrates facing each other;
a liquid crystal layer arranged between the first and second substrates;
first and second alignment films arranged on liquid crystal layer side-surfaces of the first and second substrates, respectively; and
first and second polarization plates,
the first polarization plate being arranged on a side opposite to the liquid crystal layer side of the first substrate,
the second polarization plate being arranged on a side opposite to the liquid crystal layer side of the second substrate,
wherein the first alignment film has an alignment portion in a frame region, an alignment direction of the alignment portion being in accordance with a polarization axis direction of the first polarization plate, and
the second alignment film has a non-alignment portion for which an alignment treatment is not provided,
the non-alignment portion of the second alignment film is positioned in a region corresponding to the alignment portion of the first alignment film.

12 Claims, 16 Drawing Sheets

(a)  (b)

(a)  (b)  (c)

(a)

(b)

(a)

(b)

(a)

(b)

(a)

(b)

(a)   (b)

LIQUID CRYSTAL DISPLAY DEVICE AND PRODUCTION METHOD THEREOF

This application is the U.S. national phase of International Application No. PCT/JP2008/058362, filed 1 May 2008, which designated the U.S. and claims priority to Japanese Application No. 2007-245732, filed 21 Sep. 2007, the entire contents of each of which are hereby incorporated by reference.

TECHNICAL FIELD

The present invention relates to a liquid crystal display device and a production method thereof. More particularly, the present invention relates to an active matrix liquid crystal display device with excellent display qualities and a production method thereof.

BACKGROUND ART

Liquid crystal display devices are now being widely used in a TV, a monitor for personal computers, and the like, because they are display devices with low electrical power consumption and can be reduced in weight and thickness. The liquid crystal display devices are non-self-emitting display devices and include a liquid crystal display panel containing liquid crystal molecules interposed between a pair of substrates (an active matrix substrate and a color filter substrate) and a back light. Such liquid crystal display devices display images using light from the back light by electrically controlling alignment of the liquid crystal molecules, thereby adjusting the light amount.

Such liquid crystal display devices include an alignment film on a liquid crystal layer-side surface of the liquid crystal display panel and this film regulates an alignment direction of liquid crystal molecules. This alignment film is usually subjected to an alignment treatment. The alignment treatment is made, for example, by rubbing, photo-alignment, and the like. According to the rubbing, an alignment film surface is rubbed with a cloth wound on a roller. In this technique, dusts such as a fiber of the cloth and rubbed scrapes are generated, and further, static electricity generated due to the fiber of the cloth might cause defects such as malfunction, a change in characteristics, and deterioration, of switching elements.

In the photo-alignment, a photo-alignment film is used as a material for the alignment film, and the photo-alignment film is exposed to light such as UV light, and thereby the photo-alignment film is provided with an alignment regulating force and/or an alignment regulating direction of the photo-alignment film is changed. Thus, in this technique, the alignment film can be subjected to the alignment treatment in a contactless manner. Therefore, soils, dusts, and the like that are generated by the alignment treatment can be reduced. Further, use of this photo-alignment technique allows photo-irradiation to the alignment film in desired regions under various conditions when the photo-irradiation is performed through a pattern photomask including transmissive parts formed in a desired pattern. Thus, the photo-alignment process easily enables for each pixel to be divided into two or more domains different in alignment (tilt) direction of liquid crystal molecules, and further such domains can be easily formed into a desired shape.

Liquid crystal display panels typically have a display region where images are displayed and a frame region therearound not contributing to display. In this frame region, a light-shielding layer is usually arranged to shield light from a backlight. A resin black matrix (BM), which is formed in a color filter substrate, is usually used as the light-shielding layer.

Such a BM now needs to have a very small thickness in order for liquid crystal display devices to show a higher response rate by decreasing a distance (cell thickness) between the substrates. As a result, a transmittance of light that passes through the BM is increased, which causes light leakage from the frame region. This light leakage might have adverse effects on images displayed in the display region. Accordingly, such a conventional liquid crystal display device has room for improvement in display qualities in the vicinity of the frame region.

Patent Document 1, for example, disclosed that a light shield device is arranged between drawing wirings formed in a frame region in order to suppress generation of light leakage from an end of a display region.

[Patent Document 1]
U.S. Pat. No. 6,975,377

DISCLOSURE OF INVENTION

According to the technology in Patent Document 1, if the light shield device is arranged to cover adjacent two drawing wirings and if one of the adjacent two drawing wings and the light shield device are leaked because of a film formation defect of an interlayer insulating film that is formed between the drawing wirings and the light shield device, the light shield device covers the other drawing wiring into which a different signal is fed. As a result, the adjacent two drawing wirings are influenced by each other's signals. If a film formation defect between one of adjacent two drawing wirings and the light shield device and a film formation defect between the other one and the light shield device are generated, the two drawing wirings are leaked through the light shield device. So the drawing wirings and the light shield device need to be arranged with a distance therebetween. However, if the distance is large, the light shield device can not sufficiently shield light from a backlight, and so light leakage deteriorates display qualities. If the distance is small and if a residual portion of the drawing wiring is electrically connected to adjacent two drawing wirings, this electrical connection might not be corrected because the correction might cause some defects, for example, in the following case: if this residual portion is removed by laser to cut the electrical connection, the light shield device might be also welded.

Thus, conventional technologies have room for improvement in that light leakage from the frame region, particularly from a region where wirings are arranged within the frame region, is suppressed.

The present invention has been made in view of the above-mentioned state of the art. The present invention has an object to provide a liquid crystal display device capable of improving display qualities in the frame region without causing any defects.

The present inventors made various investigations of a liquid crystal display device capable of improving display qualities in the frame region, particularly in a region (wiring region) where wirings are arranged within the frame region without causing any defects. The inventors noted an alignment state of liquid crystal molecules in the frame region. Then the inventors found that the light leakage from the frame region, which is generated in conventional liquid crystal display devices is due to an alignment state of liquid crystal molecules in the frame region.

A mechanism of light leakage from a frame region in a conventional liquid crystal display device is mentioned with reference to FIGS. 18 to 22. FIG. 18 is a plan view schematically showing a conventional liquid crystal display panel. FIG. 19(a) is a plan view schematically showing alignment directions of alignment films in each picture element in a display region of the conventional liquid crystal display device. FIG. 19(b) is a plan view schematically showing alignment directions of liquid crystal molecules at almost the center of the thickness direction of a liquid crystal layer in each picture element in the display region of the conventional liquid crystal display device at ON-state. FIG. 19(c) is a schematic view showing polarization axis directions of polarization plates in the conventional liquid crystal display device. FIGS. 20(a) and 20(b) are perspective views each schematically showing aligning liquid crystal molecules at OFF-state and ON-state, respectively, in the display region of the conventional liquid crystal display device. FIG. 21 is a schematic view showing: the polarization axis directions of the polarizing plates and the alignment directions of the vertical alignment films; and the aligning liquid crystal molecule state at ON-state in the conventional liquid crystal display device. FIG. 22 is another view schematically showing the same as in FIG. 21. In FIG. 22, the dotted circle shows that the liquid crystal molecules are aligned in various directions.

A frame region-portion of an alignment film is provided with an alignment treatment similarly to a display region-portion thereof or provided with no alignment treatment, conventionally. The former case is mentioned first. AVATN liquid crystal display device where one pixel is divided into four domains (hereinafter, also referred to as a "4VATN") is mentioned below as an example. According to such a 4VATN liquid crystal display device, vertical alignment films (VA films) are arranged one on each substrate so that their alignment directions are perpendicular to each other, thereby aligning liquid crystal molecules to be twisted.

A conventional 4VATN liquid crystal display panel 200 includes a display region 131, a frame region 132, which is a light-shielding region, and a terminal region 133, as shown in FIG. 18. In the display region 131, as shown in FIG. 19(a), a VA film on an active matrix substrate is provided with an alignment treatment in directions that are opposite and parallel to each other (in FIG. 19(a), directions shown by solid arrows) in each picture element 108 and a VA film on a counter substrate is also provided with an alignment treatment in directions that are opposite and parallel to each other (in FIG. 19(a), directions shown by dashed arrows) in each pixel 108. As shown in FIG. 19(a), alignment directions 121a of the VA film on the active matrix substrate are perpendicular to alignment directions 121b of the VA film on the counter substrate when principal surfaces of the both substrates are viewed in plane. Further, a polarization axis direction 122a of the polarization plate on the active matrix substrate is perpendicular to a polarization axis direction 122b of the polarization plate on the counter substrate when the principal surfaces of the both substrates are viewed in plane, as shown in FIG. 19(c). The polarization plates are arranged so that their polarization axis directions correspond to the alignment directions of the VA films on the respective substrates. A liquid crystal layer including nematic liquid crystal molecules with negative dielectric anisotropy are interposed between the active matrix substrate and the counter substrate.

In the display region 131 of the conventional liquid crystal display panel 200, liquid crystal molecules 130 are aligned substantially vertically to principal surfaces of the active matrix substrate 101 and the counter substrate 102 under no voltage application to the liquid crystal layer (at OFF-state) as shown in FIG. 20(a). In such a state, light that has been polarized by one polarization plate passes through the liquid crystal layer without being rotated, and then blocked by the other polarization plate. As shown in FIG. 20(a), the liquid crystal molecules 130 are slightly tilted at a pretilt angle 17 in the alignment directions 121a on the active matrix substrate 101 and in the alignment direction 121b on the counter substrate 102.

Upon application of a voltage to the liquid crystal layer (at ON-state), as shown in FIG. 20(b), the liquid crystal molecules 130 in the display region 131 are aligned substantially horizontally to the principal surfaces of the active matrix substrate 101 and the counter substrate 102, and as shown in FIG. 21, the molecules 130 are aligned to be twisted 90°. The liquid crystal molecules 130c, which are at the center of the liquid crystal layer-thickness direction, are aligned at 45° with respect to the polarization axis directions 122a and 122b at ON-state, as shown in FIG. 19(b). So light that has polarized by one polarization plate is rotated 90° in the liquid crystal layer to pass through the other polarization plate. Thus the conventional liquid crystal display panel 200 provides display.

In the frame region 132, a voltage is almost constantly applied to drawing wirings connected to scanning signal lines, data signal lines, and the like, regardless of the ON- or OFF-state of respective pixels (respective picture elements) in the display region 131. Accordingly, liquid crystal molecules in the frame region 132, particularly near the drawing wirings, are aligned at an angle with respect to or horizontally to the principal surfaces of the active matrix substrate and the counter substrate due to an electric field given by the drawing wirings. A frame region 132-portion of the VA films has been provided with the same alignment treatment as that for a display region 131-portion thereof, and as a result, some liquid crystal molecules are aligned to be twisted 90° in the liquid crystal layer thickness direction. Thus, in the frame region 132, particularly near the drawing wiring, light leakage is possibly generated due to the electric field applied to the drawing wiring regardless of the ON- or OFF-state. In order to prevent this light leakage, the frame region 132 is light-shielded by a light-shielding layer provided in the counter substrate 102. However, as mentioned above, the thickness of the light-shielding layer, which is a resin BM, becomes smaller in recent years. Thus in the frame region 132 of the conventional liquid crystal display panel 200, light is not completely shielded by the light-shielding layer to pass through the polarization plate on the display face side.

The case where the frame region-portion of the alignment film is provided with no alignment treatment is mentioned below. The liquid crystal display device in this case is the same as the panel 200 except that the frame region-portion of the alignment film is not provided with an alignment treatment. An alignment state of liquid crystal molecules in the frame region is mainly mentioned below.

As mentioned above, in the frame region 132, a voltage is almost constantly applied to drawing wirings connected to scanning signal lines, data signal lines, and the like, regardless of the ON- or OFF-state of respective pixels (respective picture elements) in the display region 131. The drawing wirings are not formed in a uniform shape and directed in various directions, and therefore an electric field generated by the drawing wirings is formed in various directions. The frame region 132-portion of the alignment film is not provided with an alignment treatment, and so alignment directions of the liquid crystal molecules in the frame region 132 are not regulated. Accordingly, as shown in FIG. 22, the liquid crystal molecules in the frame region 132 on both of the substrates 101 and 102 are tilted in various directions. This results in that some liquid crystal molecules are aligned in directions different from the polarization axis direction, and specifically, some liquid crystal molecules are aligned to be twisted in such a direction that light passes through the polarization plate. Thus, light leakage from the frame region 132 is generated also when the alignment film in the frame region 132 is not provided with no alignment treatment.

As mentioned above, when the frame region-portion and the display region-portion of the alignment film are provided with the same alignment treatment, the liquid crystal alignment in the frame region is similar to that in the display region through which light passes in principle, which leads to light leakage. In the case where the frame region-portion of the alignment film is not provided with no alignment treatment, at least some of the liquid crystal molecules in the frame region are aligned in such a direction that light passes through the liquid crystal layer, which results in light leakage. Thus in the conventional liquid crystal display device, the display qualities in the vicinity of the frame region are deteriorated regardless of whether the frame region-portion of the alignment film is provided with an alignment treatment or not.

After further investigations, the inventors found that light leakage from the frame region can be prevented in the following embodiment: in an alignment film and a polarization plate arranged on the same substrate side, the alignment film has an alignment portion in a frame region, an alignment direction of the alignment portion being in accordance with a polarization axis direction of the polarization plate; and a portion corresponding to the alignment portion of an alignment film arranged on the other substrate is not provided with the alignment treatment. As a result, the above-mentioned problems have been admirably solved, leading to completion of the present invention.

That is, the present invention is a liquid crystal display device including:

first and second substrates facing each other;

a liquid crystal layer arranged between the first and second substrates;

first and second alignment films arranged on liquid crystal layer side-surfaces of the first and second, substrates, respectively; and first and second polarization plates, the first polarization plate being arranged on a side opposite to the liquid crystal layer side of the first substrate, the second polarization plate being arranged on a side opposite to the liquid crystal layer side of the second substrate, wherein the first alignment film has an alignment portion in a frame region, an alignment direction of the alignment portion being in accordance with a polarization axis direction of the first polarization plate, and the second alignment film has a non-alignment portion for which an alignment treatment is not provided, the non-alignment portion of the second alignment film is positioned in a region corresponding to the alignment portion of the first alignment film.

According to this, more liquid crystal molecules can be aligned in the polarization axis direction of the first polarization plate in an overlapping region between the alignment portion and the non-alignment portion. According to this, the polarization axis directions of the first and second polarization substrates are appropriately determined, which permits reduction in light passing through the liquid crystal layer in the alignment portion. As a result, light leakage in the overlapping region between the alignment portion and the non-alignment treatment portion, i.e., in the frame region can be suppressed. Further, the alignment treatment for the frame region-portion of the alignment films is performed in the above-mentioned manner, so defects such as leakage defect are not generated in the liquid crystal display device of the present invention. Thus, according to the liquid crystal display device of the present invention, display qualities in the frame region can be improved without causing any defects.

It is also preferable that the first alignment film has, in the frame region, an alignment portion where the liquid crystal molecules near the first alignment film are controlled to be aligned in a direction in accordance with the polarization axis direction of the first polarization plate.

The liquid crystal display device of the present invention is preferably an active matrix liquid crystal display device but may be a passive matrix liquid crystal display device.

In the present description, the alignment direction of the alignment portion may not be necessarily completely the same as but preferably substantially parallel to the polarization axis direction of the first polarization film when the principal surfaces of the first and second substrates are viewed in plane.

In the present description, more specifically, the region corresponding to the alignment portion may be a region overlapping with the alignment portion when the principal surfaces of the first and second substrates are viewed in plane.

The configuration of the liquid crystal display device of the present invention is not especially limited. The liquid crystal display device of the present invention may or may not include other components as long as it essentially includes the above-mentioned components.

A production method of the liquid crystal display device of the present invention is not especially limited, but the below-mentioned production method of a liquid crystal display device of the present invention is preferably employed. The below-mentioned production method permits easier production of the liquid crystal display device of the present invention.

Preferable embodiments of the liquid crystal display device of the present invention are mentioned below in detail. Various embodiments in the liquid crystal display device of the present invention may be appropriately employed.

In order to suppress light leakage from a wider range of the frame region, the following embodiment is preferable: a portion of the second alignment film, corresponding to the alignment portion of the first alignment film, is not provided with the alignment treatment. This embodiment allows light leakage to be suppressed in the entire alignment portion in the frame region.

In view of suppressing light leakage from a wider range of the frame region, the following embodiment is preferable: a frame region-portion of the first alignment film is provided with an alignment treatment in a direction in accordance with the polarization axis direction of the first polarization plate and a frame region-portion of the second alignment film is provided with no alignment treatment. This embodiment allows light leakage to be suppressed in the entire frame region.

The polarization axis directions of the first and second polarization plates can be appropriately determined according to liquid crystal mode of the liquid crystal display device of the present invention, except for parallel Nicol. It is preferable that the first and second polarization plates are arranged in cross-Nicol in view of more effectively suppressing light leakage from the frame region. According to this, polarized light that has passed through one polarization plate is not rotated in the liquid crystal layer in the frame region, and this polarized light can be effectively blocked by the other polarization plate. As a result, light leakage from the frame region can be more effectively suppressed.

The first and second polarization plates are not necessarily arranged so that the polarization axis directions thereof are completely perpendicular to each other. It is preferable that an angle made by the polarization axis directions is preferably 89.4° or larger when the principal surfaces of the first and second substrates are viewed in plane, i.e., within a range of 90°±0.6°. It is more preferable that the angle is 89.7° or larger, i.e., within a range of 90°±0.3°. It is still more preferable that the polarization axis directions of the first and second polarization plates are substantially perpendicular to each other when the principal surfaces of the first and second substrates are viewed in plane.

In order to more effectively suppress light leakage from the frame region, it is preferable that the first and second alignment films are vertical alignment films, and the liquid crystal layer contains a nematic liquid crystal material with negative dielectric anisotropy. According to this, the liquid crystal display device of the present can be a normally black VA device where generation of light leakage in black display state is suppressed in principle. So light leakage from the frame region can be more effectively suppressed.

In order to more effectively suppress light leakage from the frame region, the following embodiments are preferable:

the first alignment film is arranged on a back side; at least one of the first and second substrates includes a drawing wiring in the frame region, and the alignment portion of the first alignment film corresponds to the drawing wiring-including region;

and at least the first substrate includes a drawing wiring in the frame region, and the alignment portion of the first alignment film corresponds to the drawing wiring-including region.

At least one of the first and second substrate may include a drawing wiring in the frame region, and the alignment portion of the first alignment film may overlap with the drawing wiring-including region when the principal surfaces of the first and second substrates are viewed in plane. Alternatively, at least the first substrate may include a drawing wiring in the frame region, and the alignment portion of the first alignment film may overlap with the drawing wiring-including region when the principal surfaces of the first and second substrates are viewed in plane.

It is preferable that the alignment direction of the alignment portion is substantially the same as that of a display region-portion of the first alignment film in order to simplify the production processes of the liquid crystal display device of the present invention. According to this, the alignment portion and the display region-portion of the first alignment film can be simultaneously provided with the alignment treatment.

The alignment direction of the alignment portion is not necessarily completely the same as the alignment direction of the display region-portion, and a difference between the two which is possibly generated when the alignment portion and the display region-portion of the first alignment film are simultaneously provided with the alignment treatment is acceptable.

From the same viewpoint, the frame region-portion of the first alignment film may be substantially the same in the alignment direction as the display region-portion thereof.

It is preferable that the pair of first and second alignment films are photo-alignment films in view of easily providing the liquid crystal display device of the present invention.

The present invention is also a production method of a liquid crystal display device including: first and second substrates facing each other;

a liquid crystal layer arranged between the first and second substrates;

first and second alignment films arranged on liquid crystal layer side-surfaces of the first and second substrates, respectively; and first and second polarization plates, the first polarization plate being arranged on a side opposite to the liquid crystal layer side of the first substrate, the second polarization plate being arranged on a side opposite to the liquid crystal layer side of the second substrate, the production method including:

an alignment treatment step of providing the first alignment film with an alignment treatment in a direction in accordance with a polarization axis direction of the first polarization plate, thereby providing the first alignment film with an alignment portion in a frame region; and an attachment step of attaching the first substrate having undergone the alignment treatment in the alignment treatment step to the second substrate, wherein the second alignment film has a non-alignment portion for which an alignment treatment has not been provided, and the non-alignment portion of the second alignment film is positioned in a region corresponding to the alignment portion of the first alignment film.

According to this, in a liquid crystal display device produced by the production method of the present invention, more liquid crystal molecules that are aligned in the polarization axis direction of the first polarization plate in the overlapping region between the alignment portion and the non-alignment portion within the frame region. Accordingly, by appropriately determining polarization axis directions of the first and second polarization plates, light that passes through the liquid crystal layer in the alignment portion can be decreased. This leads to suppression of light leakage from the overlapping region between the alignment portion and the non-alignment treatment portion, i.e., the frame region. According to the production method of the present invention, the alignment films in the frame region can be provided with the alignment treatment in the above-mentioned manner, and then the substrates are attached, so defects such as leakage defect are not generated. Thus, the production method of the present invention can provide a liquid crystal display device where display qualities in the frame region have been improved without causing any defects.

The alignment treatment may not be necessarily performed so that the alignment direction is completely the same as the polarization axis direction, but preferably performed so that the alignment direction is substantially parallel to the polarization axis direction when the principal surfaces of the first and second substrates are viewed in plane.

The production method of the present invention may or may not include other steps as long as it includes the above-mentioned exposure step.

The liquid crystal display device produced by the present invention includes: the first and second substrates facing each other;

a liquid crystal layer arranged between the first and second substrates;

the first and second alignment films arranged on liquid crystal layer side-surfaces of the first and second substrates, respectively; and the first and second polarization plates, the first polarization plate being arranged on a side opposite to the liquid crystal layer side of the first substrate, the second polarization plate being arranged on a side opposite to the liquid crystal layer side of the second substrate. The configuration of the liquid crystal display device produced by the production method of the present invention is not especially limited. The liquid crystal display device may or may not include other components as long as it essentially includes the above-mentioned components.

The liquid crystal display device produced by the present invention is preferably an active matrix liquid crystal display device but may be a passive matrix one.

Preferable embodiments and configurations in the production method of the present invention are mentioned in detail below. Various embodiments and configurations in the production method of the present invention may be appropriately employed.

In order to suppress light leakage from an even wider range of the frame region, it is preferable that a portion of the second alignment film, corresponding to the alignment portion of the first alignment film, has not been provided with the alignment treatment. According to this, light leakage from the entire alignment portion within the frame region can be suppressed.

In order to suppress light leakage from an even wider range of the frame region, it is preferable that in the alignment treatment step, a frame region-portion of the first alignment film is provided with the alignment treatment in the direction in accordance with the polarization axis-direction of the first polarization plate, and in the attachment step, the first substrate having undergone the alignment treatment in the alignment treatment step is attached to the second substrate, wherein a frame region-portion of the second alignment film has not been provided with the alignment treatment. According to this, light leakage from the entire frame region can be suppressed.

The relationship of the polarization axis directions between the first and second polarization plates can be appropriately determined depending on liquid crystal mode of a liquid crystal display device produced by the production method of the present invention, except for parallel-Nicol. It is preferable that the first and second polarization plates are arranged in cross-Nicol in view of more effectively suppressing light leakage from the frame region. According to this, polarized light that has passed through one polarization plate is not rotated in the liquid crystal layer in the frame region, and this polarized light can be effectively blocked by the other polarization plate. As a result, light leakage from the frame region can be more effectively suppressed.

In order to more effectively suppress light leakage from the frame region, it is preferable that the first and second alignment films are vertical alignment films, and the liquid crystal layer contains a nematic liquid crystal material with negative dielectric anisotropy. According to this, the liquid crystal display device produced by the production method of the present can be a normally black VA device where generation of light leakage in black display state is suppressed in principle. So light leakage from the frame region can be more effectively suppressed.

In order to more effectively suppress light leakage from the frame region the following embodiments are preferable:

the first alignment film is arranged on a back side;

at least one of the first and second substrates includes a drawing wiring in the frame region, and in the alignment treatment step, the first alignment film is provided with the alignment treatment so that the alignment portion corresponds to the drawing wiring-including region; and at least the first substrate includes a drawing wiring in the frame region, and in the alignment treatment step, the first alignment film is provided with the alignment treatment so that the alignment portion corresponds to the drawing wiring-including region.

At least one of the first and second substrates may include a drawing wiring in the frame region, and in the alignment treatment step, the first alignment film may be provided with the alignment treatment so that the alignment portion overlaps with the drawing wiring-including region.

Alternatively, at least the first substrate may include a drawing wiring in the frame region, and in the alignment treatment step, the first alignment film may be provided with the alignment treatment so that the alignment portion overlaps with the drawing wiring-including region.

In order to simplify the production processes, it is preferable that in the alignment treatment step, the alignment portion and a display region-portion of the first alignment film are simultaneously or successively provided with the alignment treatment.

From the same viewpoints, the frame region-portion of the first alignment film is substantially the same in the alignment direction as the display region-portion thereof.

The alignment direction of the frame region-portion of the alignment film is not necessarily completely the same as the alignment direction of the display region-portion thereof, and a difference between the two alignment directions which is possibly generated when the alignment portion and the display region-portion of the first alignment film are simultaneously provided with the alignment treatment is acceptable.

The alignment treatment in the production method of the present invention may be performed by any process, and photo-alignment, rubbing, and the like, may be employed. Photo-alignment is preferable in order to easily perform the production method of the present invention without complicating the alignment treatment step. That is, in view of such a viewpoint, it is preferable that the first and second alignment films are photo-alignment films, and in the alignment treatment step, the photo-alignment films are exposed.

EFFECT OF THE INVENTION

According to the liquid crystal display device of the present invention, display qualities in the frame region can be improved without causing any defects.

BEST MODES FOR CARRYING OUT THE INVENTION

The present invention is mentioned in more detail below with reference to Embodiments using drawings, but not limited thereto.

Embodiment 1

A 4VATN liquid crystal display device is mentioned in the present Embodiment, but the liquid crystal mode of the present invention is not especially limited to 4VATN.

FIG. 1 is a plan view schematically showing a liquid crystal display device of Embodiment 1.

The liquid crystal display device of the present Embodiment includes a liquid crystal display panel 100 and a backlight unit (not shown) arranged on a back face side (opposite to an observation face side) of the panel 100. The liquid crystal display panel 100 has a display region (effective display region) 31 where images are displayed and a frame region (non-display region, non effective display region) 32 having no contribution to display and arranged around the display regional. The display region 31 is composed of a plurality of pixels arranged in a matrix pattern. The display region 31 includes a light-shielding region arranged around and/or inside each pixel. Each pixel is composed of red, blue, and green picture elements. The panel 100 further has a terminal region 33 around the frame region 32, and in such a region, a plurality of terminals through which a driving IC is connected to the panel 100 are arranged.

The configuration of the liquid crystal display panel 100 is mentioned below. FIG. 2 is a cross-sectional view schematically showing a configuration of the display region of the liquid crystal display panel of Embodiment 1. The panel 100 includes: a pair of substrate facing each other, an active matrix substrate 1 and a counter substrate 2; and a liquid crystal layer 3 containing nematic liquid crystal molecules with negative dielectric anisotropy and arranged between the substrates 1 and 2.

The active matrix substrate 1 includes a transparent electrode (pixel electrode) 4a applying a driving voltage to the liquid crystal layer 3, and a vertical alignment film (VA film) 5a, stacked in this order toward the liquid crystal layer 3 on an insulating substrate 26a. Similarly, the counter substrate 2 includes a transparent electrode (common electrode) 4b applying a driving voltage to the liquid crystal layer 3, and a vertical alignment film 5b, stacked in this order toward the liquid crystal layer 3 on an insulating substrate 26b. The films 5a and 5b are arranged on liquid crystal layer 3-side surfaces of the substrates 1 and 2, respectively. The transparent electrode 4a is arranged corresponding to each pixel constituting the display region 31, and the transparent electrode 4b is formed in continuity over at least the display region 31. The alignment films 5a and 5b are formed to cover at least the display region 31 and the frame region 32.

On a principal surface opposite to the liquid crystal layer 3 surface of the active matrix substrate 1, a retardation plate 7a and a polarization plate 6a are arranged in this order on the insulating substrate 26a. Similarly, on a principal surface opposite to the liquid crystal layer 3 of the counter substrate 2, a retardation plate 7b and a polarization plate 6b are arranged in this order on the insulating substrate 26b. The polarizing plates 6a and 6b and the retardation plates 7a and 7b are arranged to cover at least the display region 31 and the frame region 32. The retardation plates 7a and 7b may not be, but preferably arranged in view of wide viewing angle. Only one of the retardation plates 7a and 7b may be arranged.

FIG. 3(*a*) is a plan view schematically showing alignment directions of the alignment films in each picture element in the display region of the liquid crystal display device of Embodiment 1. FIG. 3(*b*) is a plan view schematically showing alignment directions of the liquid crystal molecules at almost the center of the thickness direction of the liquid crystal layer in each picture element in the display region at ON-state of the liquid crystal display device of Embodiment 1. FIG. 3(*c*) is a schematic view showing polarization axis directions of the polarization plates in the liquid crystal display device of Embodiment 1.

Each of the alignment films 5a and 5b is provided with an alignment treatment so that each picture element 8 in the display region 31 is divided into two domains with alignment directions that are parallel and opposite to each other, as shown in FIG. 3(*a*). An alignment direction 21a of the alignment film 5a on the active matrix substrate 1 is substantially perpendicular to an alignment direction 21b of the alignment film 5b on the counter substrate 2, as the panel 100 is viewed in plane. Further, a polarization axis direction 22a of the polarization plate 6a is perpendicular to a polarization axis direction 22b of the polarization plate 6b when the panel 100 is viewed in plane, as shown in FIG. 3(*c*). That is, the polarization plates 6a and 6b are arranged in cross-Nicol. The polarization plate 6a is arranged so that its polarization axis direction 22a is in accordance with the alignment direction 21a of the alignment film 5a. Similarly, the polarization plate 6b is arranged so that its polarization axis direction 22b is in accordance with the alignment direction 21b of the alignment film 5b.

FIG. 4(*a*) is a perspective view schematically showing an alignment state of the liquid crystal molecules in the display region at OFF-state in the liquid crystal display device of Embodiment 1. FIG. 4(*b*) is a perspective view schematically showing an alignment state of the liquid crystal molecules in the display region at ON-state in the liquid crystal display device of Embodiment 1.

In the display region 31, the liquid crystal molecules contained in the liquid crystal layer 3 are substantially vertically aligned to the principal surfaces of the substrates 1 and 2 under no voltage application to the liquid crystal layer 3 (at OFF-state), as shown in FIG. 4(*a*). Under such a condition, light is not rotated when passing through the liquid crystal layer 3. So light from a backlight is polarized by the polarization plate 6a and then blocked by the polarization plate 6b. That is, the liquid crystal display device of the present Embodiment is in normally black mode operation at OFF-state. The polarization plate 6a is a polarizer. The polarization plate 6b is an analyzer.

liquid crystal molecules 30a, which are near the active matrix substrate 1, and liquid crystal molecules 30b, which are near the counter substrate 2, are slightly tilted in the alignment direction 21a of the alignment film 5a and the alignment direction 21b of the alignment film 5b at OFF state, respectively, as shown in FIG. 4(*a*). That is, the liquid crystal molecules 30a and 30b are provided with a pretilt angle 17 of several degrees, respectively. This pretilt angle is attributed to the alignment treatment of the alignment films 5a and 5b, provided in the below-mentioned alignment treatment step. Liquid crystal molecules 30d, which are not near the substrates 1 and 2, are also tilted at several degrees with respect to the principal surfaces of the substrates 1 and 2. It is preferable that the pretilt angle (the angle made by long axes of the liquid crystal molecules 30a and 30b with the principal surfaces of the substrates 1 and 2) is 85° or larger and smaller than 90° in the display region 31 at OFF-state.

Upon application of a voltage to the liquid crystal layer 3 (at ON-state), the liquid crystal molecules 30d are aligned substantially parallel to the principal surfaces of the substrates 1 and 2 in accordance with a level of the applied voltage, as shown in FIG. 4(*b*). The liquid crystal molecules 30a, 30b, and 30d are aligned to be twisted in the thickness direction of the liquid crystal layer 3 by a degree corresponding to a difference between two alignment directions 21a and 21b, i.e., by 90°. Liquid crystal molecules 30c, which are at the center of the thickness direction of the liquid crystal layer 3, are each aligned at an angle of 45° with respect to the polarization axis directions 22a and 22b at ON-state, as shown in FIG. 3(*b*). Light that has been polarized by the polarization plate 6a is rotated by 90° in the liquid crystal layer 3 to pass through the polarization plate 6b at ON-state. In such a manner, the liquid crystal display device of the present Embodiment provides transmissive display. The liquid crystal molecules 30c in each picture element 8 are aligned in four directions perpendicular to each other at ON-state when the panel 100 is viewed in plane, as shown in FIG. 3(b). Thus the liquid crystal display device of the present Embodiment can provide a wide viewing angle.

The frame region 32 of the panel 100 is mentioned below. FIG. 5(a) is a plan view schematically showing alignment directions of the alignment film in each picture element in the frame region of the liquid crystal display device of Embodiment 1. FIG. 5(b) is a plan view schematically showing alignment directions of the liquid crystal molecules near the active matrix substrate in each picture element in the frame region at ON-state of the liquid crystal display device of Embodiment 1. FIG. 5(c) is a schematic view showing polarization axis directions of the polarization plates in the liquid crystal display device of Embodiment 1. FIG. 6 is a schematic view showing: the polarization axis directions of the polarization plates and the alignment directions of the vertical alignment films; and the alignment state of a liquid crystal molecule positioned on the counter substrate side in the frame region at ON-state in the liquid crystal display device of Embodiment 1. In FIG. 6, the dotted ellipse shows that the liquid crystal alignment is biased toward the long axis direction of the ellipse. FIG. 7(a) is a cross-sectional view schematically showing a configuration in the frame region at ON-state in the liquid crystal display device of Embodiment 1. FIG. 7(b) is a perspective view thereof.

In the frame region 32, the alignment film 5a on the active matrix substrate 1 is provided with an alignment treatment in directions in accordance with the polarization axis direction 22a of the polarization plate 6a, which is arranged on the same substrate, i.e., on the active matrix substrate 1, as shown in FIGS. 5(a) and 5(c). Specifically, the alignment direction 21a (the solid arrow in FIG. 5(a)) of the alignment film 5a are in accordance with the polarization axis direction 22a when the panel 100 is viewed in plane. Thus, the frame region 32-portion of the alignment film 5a is the alignment portion where the alignment direction is regulated so as to be in accordance with the polarization axis direction 22a of the polarization plate 6a, which is arranged on the same substrate, i.e., the active matrix substrate 1. The alignment film 5b on the counter substrate 5b is provided with no alignment treatment. Thus, the frame region 32-portion of the alignment film 5b is the non-alignment treatment region with no alignment treatment. In this configuration, liquid crystal molecules in a portion where drawing wirings such as a scanning signal wiring, a data signal wiring, and the like, are not arranged of the frame region 32, which are free from influence of an electric field of the drawing wirings, are vertically aligned regardless of ON- and OFF-state. So in the drawing wiring-free region within the frame region 32, light transmission can be suppressed and as a result, light leakage from such a region can be suppressed.

The liquid crystal molecules in a region where the drawing wirings are arranged within the frame region 32 are influenced by the electric field of the drawing wirings regardless of ON- and OFF-state. Accordingly, the liquid crystal molecules in the drawing wiring-including region within the frame region 32 are tilted in various directions because of the above-mentioned reason originally. However, in fact, the liquid crystal molecules 30a, which are near the active matrix substrate 1, are aligned in the alignment direction 21a of the alignment film 5a, which is a direction perpendicular to the polarization axis direction 22b of the polarization plate 6b by alignment regulating force of the alignment film 5a when the panel 100 is viewed in plane, as shown in FIGS. 5(b) and 7. The liquid crystal molecules 30b, which are near the counter substrate 2, are also aligned in the polarization axis direction 22a of the polarization plate 6a, which is a direction in accordance with the alignment direction 21a of the alignment film 5a under influence of the alignment of the liquid crystal molecules 30a, as shown in FIG. 6. Specifically, it is possible to suppress the liquid crystal molecules in the drawing wiring-including portion of the frame region 32 from being twisted in the thickness direction of the liquid crystal layer 3 as shown in FIG. 7, even if the liquid crystal molecules in the drawing wiring-including region within the frame region 32 are aligned obliquely or horizontally to the principal surfaces of the substrates 1 and 2 due to the influence of the electric field of the drawing wirings. Accordingly, light 18 from a backlight unit is converted into polarized light (linearly polarized light) by the polarization plate 6a, which is arranged on the back face side, and then the polarized light passes through the liquid crystal layer 3 without being rotated to be blocked by the polarization plate 6b, which is arranged on the front face side and in cross-Nicol with respect to the polarization plate 6a. Thus, according to the liquid crystal display device of the present Embodiment, the liquid crystals that cause light leakage from the drawing wiring-including region within the frame region 32 can be suppressed regardless of ON- and OFF-state.

The liquid crystal molecules in the drawing wiring-including region within the frame region 32 are slightly tilted toward the principal surfaces of the substrates 1 and 2 due to the influence of the electric field of the drawing wirings, as shown in FIG. 7. Although not shown in FIG. 7, the liquid crystal molecules 30a and 30b, which are near the substrates 1 and 2, are vertically aligned by alignment regulating force of the alignment films 5a and 5b, respectively, even under the influence of the electric field of the drawing wiring, similarly to the configuration shown in FIG. 4(b).

The liquid crystal display panel 100 includes the polarization plates 6a and 6b arranged in cross-Nicol, the VA films 5a and 5b, and the liquid crystal layer 3 containing nematic liquid crystal materials with negative dielectric anisotropy. As a result, the liquid crystal display device of the present Embodiment can be operated in normally black mode where generation of light leakage in black display state is suppressed in principle, which results in more effective suppression of the light leakage from the frame region in black display state.

Preferable embodiments of the present Embodiment are mentioned below.

In the present Embodiment, it is preferable that the substrate including the alignment film the frame region-portion of which is free from the alignment treatment has few irregularities that disturb the liquid crystal alignment. According to this, the alignment of the liquid crystal layer can be regulated almost only by alignment of liquid crystal molecules near the substrate to be provided with alignment. So more liquid crystal molecules can be aligned in a direction perpendicular to the polarization axis direction of the polarization plate on the substrate including the alignment treatment-free alignment film, and as a result, a light shielding ratio in the frame region can be more improved.

As mentioned below, many members such as various wirings and conductive layers are stacked on the active matrix substrate 1, and in contrast, on the counter substrate 2, relatively few components such as a color filter layer and a common electrode, and only relatively flat members are arranged. That is, the counter substrate 2 usually has a more flat surface than that of the active matrix substrate 1. In order to more improve the light shielding ratio in the frame region 32, it is preferable that the alignment film 5a, which is arranged on the active matrix substrate 1, is provided with the alignment treatment but the alignment film 5*b*, which is arranged on the counter substrate 2, is not provided with the alignment treatment.

According to the present Embodiment, the substrate including the alignment film the frame region-portion of which is provided with the alignment treatment may be a front-side substrate, but preferably a back-side substrate (the active matrix substrate 1 of the present Embodiment) in order to more effectively suppress light leakage from a region where the wirings are arranged (the wiring region). Drawing wirings, which are directed in various directions, are usually formed on the back-side substrate in the frame region. Further, as mentioned above, the liquid crystal alignment in the wiring region is influenced by an electric field of the drawing wirings regardless of ON- and OFF-state. This influence to the liquid crystal layer can be effectively reduced by the alignment treatment to the alignment film on the back-side substrate. Accordingly, from such a viewpoint, it is preferable that the substrate including the alignment film the frame region-portion of which is provided with the alignment treatment is the substrate including the drawing wirings, i.e., the active matrix substrate 1. Further, the substrate including such an alignment film is preferably the substrate including the polarizer.

If a frame region-portion of the alignment film on the drawing wiring-free substrate or the counter substrate (each is generally the front substrate) is provided with the alignment treatment, the liquid crystal layer in the frame region tends to be more easily influenced by the electric field of the drawing wirings because the drawing wirings are typically arranged on the back substrate. Further, the extending direction of the drawing wiring varies depending on the location thereof, so the correspondence or noncorrespondence between the polarization axis direction of the back polarization plate and the tilt direction of the liquid crystal molecules in the wiring regions varies depending on location within the wiring region) This might result in light leakage generated in moire pattern.

According to the present Embodiment, the region where the alignment film is provided with the alignment treatment within the frame region is not especially limited and it may be appropriately determined. In order to more improve the display qualities, it is preferable that the alignment film in a portion corresponding to the wiring region is provided with the alignment treatment. The wiring-free region within the frame region can be light-shielded by, for example, the pattern constituted by the same layer as the drawing wiring (e.g., metal film pattern) because this region is large enough for such a pattern to be formed therein. However, it is difficult to form such a pattern in the wiring region, as in Patent Document 1. Further, light leakage easily occurs particularly in the wiring region due to the electric filed applied to the drawing wiring. Thus, the display qualities can be more effectively improved by providing the alignment treatment for the alignment film in the portion corresponding to the wiring region where measures for light leakage, which is particularly easily generated therein, are difficult to take.

From the same viewpoint, it is more preferable that a portion corresponding to the wiring region of the alignment film 5*a*, which is arranged on the active matrix substrate 1, is provided with the alignment treatment. Specifically, it is more preferable that a portion corresponding to the wiring region of the alignment film arranged on the drawing wiring-including substrate. This embodiment can more ease the influences of the electric field given by the drawing wiring on the liquid crystal molecules in the frame region to more suppress the light leakage, and further it can more effectively improve the display qualities in the wiring region where measures for light leakage generated therein are difficult to take.

A production method of the liquid crystal display device of the present Embodiment is mentioned below. FIG. 8(*a*) is a plan view schematically showing an active matrix substrate of Embodiment 1. FIG. 8(*b*) is a plan view schematically showing a counter substrate of Embodiment 1.

A pair of substrates, an active matrix substrate 1 having such a configuration as in FIG. 8(*a*) and a counter substrate 2 having such a configuration as in FIG. 8(*b*), are prepared in common procedures. The active matrix substrate 1 is produced in the following procedures. Scanning signal wirings 9, TFTs 11, pixel electrodes 12, data signal wirings 10, and drawing wirings 19 are successively formed on an insulating substrate of glass and the like (not shown). The wirings 9 and 10 are arranged with an insulating film (not shown) therebetween and crossed with each other to form a lattice pattern. The TFT 11 and the pixel electrode 12 are arranged at each intersection of the two wirings 9 and 10. Further, the drawing wirings 19 are connected to the wirings 9 and 10. Thus, the region where the pixel electrodes 12 are arranged in a matrix pattern is a display region where images are displayed, and the region surrounding the display region is a frame region. Thus, the drawing wirings 19 are formed in the frame region. The drawing wirings 19 are wirings for drawing wirings that are formed in the display region such as the wirings 9 and 10, in the frame region. The drawing wiring 19 connected to the wiring 9 may or may not be constituted by the same layer as the wiring 9. The drawing wiring 19 connected to the wiring 10 may or may not be constituted by the same layer as the wiring 10. The active matrix substrate 1 may include a storage capacitor wiring and may further include a drawing wiring connected thereto in the frame region. The active matrix substrate 1 of the present Embodiment is also called a TFT array substrate.

The counter substrate 2 is produced in the following procedures. A black matrix (BM) 13, color filters 14 composed of colored layers of red (R), blue (B), and green (G), a protective film (not shown), and a transparent electrode film (not shown), are successively formed on an insulating substrate of glass and the like (not shown). The BM 13 is formed in a lattice pattern corresponding to a boundary of respective picture elements (the pixel electrodes 12) and also formed in a band shape to surround the region where the picture elements are arranged. The color filters 14 are formed in regions partitioned by the lattice-patterned BM 13, one in each region. Thus, in the present Embodiment, one pixel is composed of three picture elements of RGB aligned in the x-axis direction (in the lateral direction when the display face is viewed in front). The region where the BM 13 is formed in a lattice pattern corresponds to the display region. The region where the BM 13 is formed in a band shape corresponds to the frame region. Although light leakage from the frame region 32 is supposed to be suppressed by the BM 13, the BM 13 is insufficient to suppress light leakage from a wiring 19-free region within the frame region 32, especially from the vicinity of the wirings 19 because the BM, which is usually made of a black resin, is recently formed to have a smaller thickness. The insulating substrate the substrates 1 and 2 each include is not especially limited to glass as long as it has an insulating surface. Commonly used materials may be used as a material for components of the substrates 1 and 2. The counter substrate 2 of the present Embodiment is also called a CF substrate.

Then alignment films 5*a* and 5*b* are formed on the substrates 1 and 2, respectively, in the following manner. A solution containing a photo-alignment film material is applied to the substrates 1 and 2, for example, by spin casting, and then, the solution is baked, for example, at 180° C. for 60 minutes. The material for the alignment films 5a and 5b is not especially limited, and the photo-alignment film material is preferable in order to easily produce the liquid crystal display device of the present Embodiment, efficiently perform the alignment treatment and suppress defects (deterioration of characteristics, generation of dusts, and the like), which is generated by the alignment treatment. That is, the alignment films 5a and 5b are preferably films which are provided with the alignment treatment by photo-alignment, and more preferably photo-alignment films which are provided with the alignment treatment by exposure.

The photo-alignment film material is not especially limited. Photosensitive group-containing resins, and the like, are mentioned as the material. More specifically, polyimide containing a photosensitive group such as a 4-chalcone group (the following formula (1)), a 4'-chalcone group (the following formula (2)), a coumarin group (the following formula (3)), and a cinnamoyl group (the following formula (4)) is preferable, for example. The photosensitive groups represented by the formulae (1) to (4) undergo a crosslinking reaction (including dimerization reaction), an isomerization reaction, a photoreorientation, and the like by light (preferably UV light). If these materials are used, a variation in pretilt angle of the liquid crystal molecules in the alignment film plane can be effectively suppressed in comparison to the case where a photodecomposition material is used as the photo-alignment film material. The photosensitive group in the following formulae (1) to (4) may have a structure in which a substituent group is bonded to the benzene ring. A cinnamate group ($C_6H_5$—CH=CH—COO—) in which an oxygen atom is further bonded to a carbonyl group in the cinnamoyl group represented by the following formula (4) is easily synthesized. Accordingly, polyimide containing a cinnamate group is more preferable as the photo-alignment film material. The baking temperature, the baking time, and the thickness of the photo-alignment film are not especially limited and may be appropriately determined.

[Formula 1]

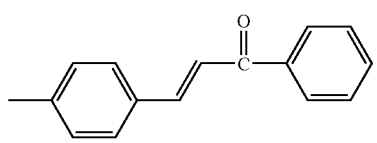

(1)

[Formula 2]

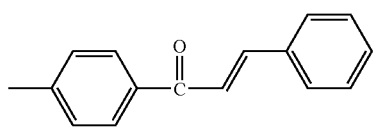

(2)

[Formula 3]

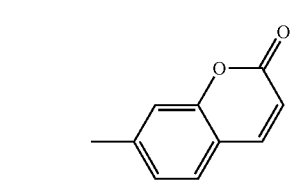

(3)

[Formula 4]

(4)

According to the present Embodiment, a photo-alignment film material that is a photo-reactive material and provides a liquid crystal molecule with a pretilt angle in an irradiation direction of a light beam is used. A photo-alignment film material that can regulate a pretilt direction in accordance with a moving direction of a photo-irradiation region can be used, as disclosed in "Photo-Rubbing Method: A Single-Exposure Method to Stable Liquid-Crystal Pretilt Angle on Photo-Alignment Film," M. Kimura and three et al, IDW' 04: proceedings of the 11th International Display Workshops, IDW" 04 Publication committee, 2004, and LCT2-1, p. 35-38. In this case, there is no need to cause light to enter the substrate from an oblique direction, and light can be caused to enter the substrate substantially vertically.

Thus, it is preferable that the alignment films 5a and 5b are made of the alignment film material that can regulate the liquid crystal alignment direction in accordance with the photo-irradiation direction or the moving direction of the photo-irradiation region. More preferably, the photo-alignment film material regulates the liquid crystal alignment direction in accordance with the photo-irradiation direction.) As a result, use of a common alignment film material makes it possible to easily provide the liquid crystal layer with a pretilt angle suitable for display mode.

The pretilt angle of the alignment films 5a and 5b for which the alignment treatment has not been provided, i.e., the pretilt angle of the non-alignment treatment portion of the alignment films 5a and 5b is not especially limited as long as it is a pretilt angle a common VA film in a VA liquid crystal display panel shows.

The alignment treatment step (exposure step) for the alignment film is mentioned below. It is preferable that the exposure is performed by scan exposure or shot exposure. Specifically, it is preferable in the alignment treatment step that the alignment films 5a and 5b are exposed with the substrate 1 or 2 and a light source being fixed (shot exposure) or that the alignment films 5a and 5b are exposed by moving at least one of the substrate 1 or 2 and a light source (scan exposure). According to the scan exposure, a constant amount of light is stably radiated to the substrate plane and so a variation in characteristics of the alignment film such as an alignment direction and a pretilt angle can be effectively suppressed. Further, a small apparatus is enough for the scan exposure and so apparatus costs can be reduced. In addition, even if the photomask has a defect or it is damaged, costs on replacement of the photomask are low.

In the scan exposure, if two panels different in pitch of transmissive parts (slits) in the scanning direction are exposed, two different photomasks need to be prepared. In contrast, according to the shot exposure, various kinds of panels can be exposed in one shot using a photomask including patterns for the various kinds of panels.

The alignment treatment for the alignment films 5a and 5b by shot exposure is mentioned first. FIG. 9 is a schematic view showing an embodiment of the 1st shot exposure for an alignment film (active matrix substrate) of Embodiment 1. FIG. 9(a) is a plan view thereof. FIG. 9(b) is a side view thereof. In FIG. 9(b), the solid arrow and dashed arrow show irradiation directions of polarized UV light (photo-irradiation directions). FIG. 10 is a cross-sectional view schematically showing an embodiment of photo-irradiation to the active matrix substrate in the exposure step of Embodiment 1. FIG. 11 is a schematic view showing an embodiment of the 1st shot exposure for an alignment film (counter substrate) of Embodiment 1. FIG. 11(a) is a plan view thereof. FIG. 11(b) is a side view thereof. In FIG. 11(b), the solid arrow shows an irradiation direction of polarized UV light (photo-irradiation direction).

The alignment treatment step (exposure step) for the active matrix substrate 1 is mentioned. As shown in FIG. 9(a), a photomask 20a having a slit pattern is prepared. The photomask 20a has a plurality of slits extending in the x-axis direction in FIG. 9, which is the vertical direction of the substrate 1 when the display face is viewed in front, and the plurality of slits are arrayed in the y-axis direction in FIG. 9 perpendicular to the x-axis direction, which is the horizontal direction of the substrate 1 when the display face is viewed in front. More specifically, the photomask 20a has a plurality of slits 25a each having a rectangular shape as viewed in plane, within a light-shielding region. The slits 25a each have a width about half of a pitch of picture elements in the y-axis direction and arranged at a pitch substantially the same as the pitch of the picture elements in the y-axis direction.

As shown in FIG. 9(a), the active matrix substrate 1 is positioned with the photomask 20a, and then the alignment film 5a in the display region 31 and the frame region 32 is exposed to polarizing UV light (the solid arrow in FIG. 9(b)) at one time with the active matrix substrate 1 and a light source (not shown, arranged above the photomask 20c) being fixed (the 1st shot). As shown in FIGS. 9(b) and 10, the active matrix substrate 1 is irradiated with polarized UV light 15 from an oblique direction. The polarized UV light 15 is radiated to the substrate 1 along the longitudinal direction of the slit 25a as the substrate 1 is viewed in plane. The photomask 20a and the substrate 1 are arranged with a certain distance (proximity gap 16) therebetween. Attributed to this distance, damages on or attachment of dusts to the substrate 1, contributed to the photomask 20a, can be prevented. As a result of the 1st shot, a half region of each pixel (each picture element) positioned in the display region 31 and about a half region of the frame region 32 are subjected to the alignment treatment in a stripe pattern. The liquid crystal molecules 30a, which are near the alignment film 5a surface, i.e., near the active matrix substrate 1, can show a substantially certain pretilt angle 17 in each exposed region, as shown in FIG. 10. The liquid crystal molecules 30a are tilted along the tilt direction of the polarized UV light 15.

The kind of the light beam radiated to the alignment films 5a and 5b is not especially limited, but as mentioned above, it is preferable that UV light, particularly, polarized UV light is radiated to the alignment films 5a and 5b. Thus, the alignment films 5a and 5b are exposed to polarized UV light, which shows anisotropy, and thereby anisotropic rearrangement or chemical reaction of molecules constituting the alignment films 5a and 5b can be easily induced. Accordingly, the alignment directions of the liquid crystal molecules 30a and 30b, which are near the alignment films 5a and 5b, can be controlled to be more uniform. The wavelength range of the UV light can be appropriately determined depending on the alignment film material to be exposed.

Then, the substrate 1 or the photomask 20a is moved by about half of the picture element pitch in the direction perpendicular to the longitudinal direction of the slits 25a. Specifically, the photomask 20a is positioned with the active matrix substrate 1 so that the slit 25a corresponds to an unexposure region of each picture element 8. The incident direction of light to the principal surface of the substrate 1 is set to be opposite to that in the 1st shot, for example, by changing the location of the light source. Similarly to the 1st shot, the unexposed portions of the alignment film 5a in the display region 31 and the frame region 32 are exposed to polarized UV light (in FIG. 9(b), the dashed arrow) by one shot with the substrate 1 and the light source being fixed (the 2nd shot). As a result of the 2nd shot, the rest about half of each pixel (each picture element) and the rest about half of the frame region 32 are provided with the alignment treatment, and thus, the entire alignment film 5a on the substrate 1 is provided with the alignment treatment. More specifically, in the active matrix substrate 1, each picture element 8 (picture elements 8R, 8G, and 8B) in the display region 31 is divided into two regions with alignment directions being opposite and parallel to each other, as shown in FIG. 3(a). The frame region 32-portion and the display region 31-portion of the alignment film 5a are provided with the alignment treatment in the same manner and in substantially the same direction.

The alignment film 5b on the counter substrate 2 is exposed through a photomask 20b having a slit pattern, similarly to the active matrix substrate 1. Specifically, as shown in FIG. 11, the alignment film 5b is also exposed twice (the 1st shot and the 2nd shot) through the photomask 20b having the slits 25b. Each slit 25b has a width about half of picture element pitch in the x-axis direction of FIG. 11, which is the vertical direction of the counter substrate 2 when the display face is viewed in front. The slits 25b are arranged at a pitch about the same as the picture element pitch in the x-axis direction. The photomask 20b has no slits 25b in a region corresponding to the frame region 32, through which light can not pass. Accordingly, the frame region 32-portion of the alignment film 5b is not exposed to UV light in both of the 1st shot and the 2nd shot to be a non-alignment treatment portion. In the display region 31, each picture element on the counter substrate 2 is divided into two regions with alignment directions being opposite and parallel to each other, as shown in FIG. 3(a). The liquid crystal molecules 30b, which are near the alignment film 5b surface, show an almost uniform pretilt angle in each domain in the display region 31, similarly to the active matrix substrate 1, as shown in FIG. 10. The frame region 32-portion of the alignment film 5b is not provided with the alignment treatment, so the liquid crystal molecules 30b that are near the frame region 32-portion of the alignment film 5b are substantially vertically aligned to the alignment film 5b surface without exhibiting a pretilt angle.

Thus, in this Embodiment, the active matrix substrate 1 and the counter substrate 2 are exposed through the different photomasks, thereby dividing one picture element into four domains in the above-mentioned manner. Specifically, in the photomask for the substrate 1, the transmissive parts are arranged in a stripe pattern at a pitch of about half of the picture element pitch in horizontal direction when the display face of the liquid crystal display device is viewed in front, i.e., the y-axis direction of FIG. 8, and in the photomask for the counter substrate 2, the transmissive parts are arranged in a stripe pattern at a pitch of about half of the picture element pitch in the vertical direction when the display face of the liquid crystal display is viewed in front, i.e., the x-axis direction of FIG. 11 (in the present Embodiment, the picture element pitch in the vertical direction is the same as the pixel pitch). The pattern of the transmissive parts of the photomasks are not especially limited, and it may be appropriately determined depending on a layout or size of the pixel (picture element), or a resolution of the panel, and the like. According to the present Embodiment, the four domains are arranged in, but not limited to, a matrix pattern, and may be arranged in a horizontal-stripe pattern. In addition, if each picture element is subdivided into some sub-pixels, the photomask may have a slit pattern for alignment division of each sub-pixel. The number of the domains in the present Embodiment is not especially limited to four and it may be two, for example. In this case, the display region 31 on only one of the substrates 1 or 2 is provided with the alignment division. If one pixel is divided into two domains, the viewing angle characteristics in only one of the vertical direction and the horizontal direction can be improved. Five or more domains may be formed, which is not preferable because the processes become complicated and the treatment time becomes longer. Further, it has been known that the viewing angle characteristics are not so different practically between four domains and five or more domains.

Materials usable in the present Embodiment and conditions of production processes applicable for the present Embodiment are mentioned below. The materials and the conditions usable in the present Embodiment are not especially limited to those mentioned below. The light beam for the exposure is not especially limited polarized UV light, and it may be appropriately determined depending on the alignment film material, the production process, and the like. Non-polarized light (extinction ratio=1:1) may be used.
Liquid crystal material: nematic liquid crystal having a birefringence Δn of 0.06 to 0.14, a dielectric anisotropy Δ∈ of −2.0 to −8.0, a Tni (transition temperature of nematic-anisotropic phase) of 60° C. to 110° C.
Pretilt angle: 85° to 89.9°
Cell gap: 2 μm to 5 μm
Irradiation energy density: 0.01 J/cm$^2$ to 5 J/cm$^2$
Proximity gap: 10 μm to 250 μm
Light source: a low pressure mercury lamp, a high pressure mercury lamp, a heavy hydrogen lamp, a metal halide lamp, an argon resonance lamp, a xenon lamp, an excimer laser
Extinction ratio of polarized UV light (polarization degree): 1:1 to 60:1
Irradiation direction of UV light: a direction that makes an angle of 0° to 60° with the normal direction of the substrate surface A step of attaching the active matrix substrate 1 to the counter substrate 2 is mentioned below. In this attachment step, a sealing member is arranged around the substrate 1 or 2, first. Then, plastic beads each having a diameter of 4 μm are sprayed on the substrate 1 or 2 on which the sealing member has been arranged, and then, the two substrates 1 and 2 are attached to each other. The relationship of the light beam-irradiation direction (the alignment direction) of the both substrates in one picture element is as shown in FIG. 3(a). The alignment directions of the substrates facing each other are substantially perpendicular to each other in each domain when the substrates 1 and 2 are viewed in plane. The non-alignment treatment portion of the alignment film 5b is arranged to correspond to the frame region 32-portion of the alignment film 5a, which has been provided with the alignment treatment.

Between the active matrix substrate 1 and the counter substrate 2, for example, the above-mentioned liquid crystal materials are injected. Such liquid crystal molecules exhibit pretilt angles in directions different among the domains. As a result, the alignment azimuth of the liquid crystal molecules in the middle of the in-plane and thickness directions of the liquid crystal layer in the respective domains is at 45° with respect to the light-irradiation direction when the substrates are viewed in plane, as shown in FIG. 3(b).

The polarization plates 6a and 6b are attached to the sides opposite to the liquid crystal layer side of the two substrates 1 and 2, respectively so that the polarization axis directions thereof satisfy the relationship shown in FIG. 3. As a result, the alignment direction 21a of the display region 31-portion and the frame region 32-portion of the alignment film 5a is in accordance with the polarization axis direction 22a of the polarizing plate 6a. That is, the frame region 32-portion of the alignment film 5a is the alignment portion where the alignment treatment direction 21a is regulated along the polarization axis direction 22a of the polarization plate 6a. The liquid crystal molecules 30 are almost vertically aligned at OFF-state, and so the liquid crystal panel 100 can provide excellent black display (normally black mode). The panel 100 shows display characteristics hardly depending on a viewing direction because one pixel is divided into four domains different in alignment direction of the liquid crystal molecules.

Then, after common module-producing steps, a 4VATN liquid crystal display device in the present Embodiment is completed.

According to the production method of the present embodiment, the frame region 32-portion and the display region 31-portion of the alignment film 5a are uniformly provided with the alignment treatment, specifically, exposed to the UV light at one time. This enables the alignment treatment step to be performed without complicating the processes.

Almost the entire frame region 32-portion of the alignment film 5a is the alignment portion, and almost the entire frame region 32-portion of the alignment film 5b is the non-alignment treatment region. So light leakage from almost in the entire frame region 32 can be suppressed.

According to the present Embodiment, the alignment portion of the alignment film 5a may not necessarily completely overlap with the non-alignment treatment portion of the alignment film 5b, but preferably, the overlapping region of the two regions is as large as possible in view of suppression of light leakage from the frame region 32.

According to the production of 4VATN display devices, as mentioned above, the number of the apparatus and the time taken for the alignment treatment (tact time) can be reduced because only two irradiations are performed for one side of each substrate, that is, totally, four irradiations are performed for the substrates, thereby forming four domains. Further, the viewing angle can be widened by dividing one pixel (one picture element) into four domains. In addition, photolithography, which is employed for production of liquid crystal devices including an alignment control structure (a structure for liquid crystal alignment control such as a projection) such as MVA devices excluding an alignment treatment, is not needed. As a result, the production processes can be simplified.

The alignment treatment for the alignment films 5a and 5b by scan exposure is mentioned below. FIG. 12 is a schematic view showing an embodiment of the 1st scan exposure to an alignment film (an active matrix substrate) of Embodiment 1. FIG. 12(a) is a plan view thereof. FIG. 12(b) is a side view thereof. In FIG. 12(b), the solid arrow shows an irradiation direction of polarized UV light (photo-irradiation direction), and the white arrow shows a moving direction of the active matrix substrate. FIG. 13 is a schematic view showing an embodiment of the 2nd scan exposure to the alignment film (the active matrix substrate) of Embodiment 1. FIG. 13(a) is a plan view thereof. FIG. 13(b) is a side view thereof. In FIG. 13(b), the solid arrow shows an irradiation direction of polarized UV light (photo-irradiation direction), and the white arrow shows a moving direction of the active matrix substrate. FIG. 14 is a plan view schematically showing the active matrix substrate that has been provided with an alignment treatment by scan exposure of Embodiment 1. The region shown with an upward-sloping or downward-sloping line shows a region that has been provided with the alignment treatment. FIG. 15 is a schematic view showing an embodiment of the 1st shot exposure to an alignment film (counter substrate) of Embodiment 1. FIG. 16 is a plan view schematically showing a counter substrate that has been provided with the alignment treatment by the scan exposure of Embodiment 1. In FIG. 16, the colored or dotted region shows a region that has been provided with the alignment treatment. FIG. 17 is a plan view schematically showing the liquid crystal display panel that has been provided with the alignment treatment by the scan exposure of Embodiment 1. In FIG. 17, the regions shown by upward-sloping or downward-sloping line, or the gray and dotted regions show a region that has been provided with the alignment treatment, and the dashed circle shows the non-alignment treatment region.

In this case, as shown in FIG. 12(a), the active matrix substrate 1 is positioned with the photomask 20c. The photomask 20c includes slits 25c having the same pitch and width as those of the slits 25a of the photomask 20a. The length in the longitudinal direction of the slit 25c is smaller than the length in the longitudinal direction of the slit 25a. The slit 25c is formed only in a region corresponding to the display region 31 and not formed in a region corresponding to the frame region 32. The photomask 20c is smaller than the active matrix substrate 1. A light source (not shown) is arranged above the photomask 20c.

The slits 25c of the photomask 20c are positioned with the picture elements on the active matrix substrate 1. Then, as shown in FIG. 12(b), polarized UV light (shown by the solid arrow in FIG. 12(b)) is radiated to the substrate 1 while the substrate 1 is moved in −x direction (shown by the white arrow in FIG. 12(b)), thereby exposing the display region 31-portion and the frame region 32-portion of the alignment film 5a from one end to the other through the photomask 20c (the 1st scan). The substrate 1 is moved so that the slit 25c is positioned along the bus wirings such as the data signal line 10 and the scanning signal line 9, which is arranged on the substrate 1. The polarized UV light 15 is radiated to the substrate 1 from the longitudinal direction of the slit 25c as the substrate 1 is viewed in plane. Similarly to shot exposure, as shown in FIGS. 12(b) and 10, the polarized UV light 15 is radiated to the substrate 1 from the oblique direction. The photomask 20c and the substrate 1 are arranged with a proximity gap 16. Attributed to this distance, damages on or attachment of dusts to the active matrix substrate 1, contributed to the photomask 20c, can be prevented. Further, attributed to this distance, the substrate 1 is moved smoothly, and even if the photomask 20c sags under its own weight, the photomask 20c is suppressed from being in contact with the substrate 1. As a result of the 1st scan, about a half region of each pixel (each picture element) in the display region 31 is provided with the alignment treatment in a stripe pattern, similarly to the 1st shot, and about a half of the regions adjacent to the display region 31 in the moving direction of the substrate 1 in the frame region 32 (the frame region 32 adjacent to the display region 31 in the x-axis direction in FIG. 12) is provided with the alignment treatment in a stripe pattern. According to the present Embodiment, the scan exposure may be performed in such a way that the substrate 1 is fixed and the photomask 20c and the light source are moved.

The active matrix substrate 1 is rotated 180° in the substrate plane, and then as shown in FIG. 13(a), the position between the slits 25c and the picture elements in the substrate 1 is adjusted so that each slit 25c is positioned in an unexposure region of each picture element. Then, as shown in FIG. 13(b), polarized UV light (shown by the solid arrow in FIG. 13(b)) is radiated to the substrate 1 while the substrate 1 is moved in +x direction (shown by the white arrow in FIG. 13(b), the direction opposite to that shown in FIG. 12(b)), thereby exposing the display region 31-portion and the frame region 32-portion of the alignment film 5a from one end to the other through the photomask 20c (the 2nd scan), as performed in the 1st scan shown in FIG. 12(b). As a result of the 2nd scan, the rest about half of each pixel (each picture element) in the display region 31 is provided with the alignment treatment, similarly to the 2nd shot, and the rest about half of the regions adjacent to the display region 31 in the scanning direction of the substrate 1 in the frame region 31 is provided with the alignment treatment. As a result of the 2nd scan, as shown in FIG. 14, the alignment film 5a in the display region 31-portion and in the portions adjacent to the display region 31 in the vertical direction (when the display face is viewed in front) of the frame region 32 is subjected to the alignment treatment in the same stripe pattern.

The light source and the photomask 20c are fixed during the 1st and 2nd scan. So an incident angle of the light beam (shown by the solid arrow in FIG. 13(b)) in the 2nd scan with respect to the substrate 1 is almost the same as an incident angle of the light beam (shown by the solid arrow in FIG. 12(b)) in the 1st scan. In addition, the substrate 1 is rotated 180° before the 2nd scan, and so the direction of the light beam radiated to the substrate 1 (the photo-irradiation direction) in the 1st scan is just opposite to the direction of the light beam radiated to the substrate 1 (the photo-irradiation direction) in the 2nd scan without changing the location of the light source and the photomask 20c and the direction of the light source.

The alignment film 5b on the counter substrate 2 is also exposed through a photomask 20d having a slit pattern, similarly to the 1st and 2nd scan for the substrate 1 (the 1st scan and the 2nd scan). The photomask 20d has slits 25d having the same pitch and width as those of the slits 25b of the photomask 20b, as shown in FIG. 15. The length in the longitudinal direction of the slit 25d is shorter than that of the slit 25b. The slit 25d is formed only in a region corresponding to the display region 31 and not formed in a region corresponding to the frame region 32. As a result of the 1st and 2nd scan for the substrate 2, the alignment film 5b in the display region 31-portion and in the portions adjacent to the display region 31 in the horizontal direction (as the display face is viewed in front) of the frame region 32 is subjected to the alignment treatment in the same stripe pattern.

Then, the substrates 1 and 2 are attached to each other to form a liquid crystal display panel 100 shown in FIG. 17. Thus as a result of the scan exposure for the alignment films 5a and 5b, a part of the frame region 32 of the substrate 1 and a part of the frame region 32 on the counter substrate 2 are provided with the alignment treatment. The region which has been provided with the alignment treatment (the alignment portion) of each substrate corresponds to the non-alignment treatment region, so light leakage from this region can be suppressed.

If the above-mentioned scan exposure is employed, portions at four corners (circled by the dashed line in FIG. 17) of the alignment films 5a and 5b are the non-alignment treatment regions. So light leakage from these regions can not be suppressed. Thus, if the alignment treatment is provided by common scan exposure, as shown in FIG. 17, it is difficult to form the alignment portion and the non-alignment treatment portion in the entire frame region 32. Accordingly, it is preferable that the alignment films 5a and 5b are provided with the alignment treatment by shot exposure in order to suppress light leakage from a wider range of the frame region 32.

If the substrates 1 and 2 are provided with the alignment treatment using a photomask having slits for the frame region 32 and the display region 31, the respective portions at four corners of the alignment films 5a and 5b are provided with the alignment treatment in the alignment direction similarly to that for the display region 31-portion of the alignment films 5a and 5b The liquid crystal display device of the present invention is characterized in the alignment treatment to the alignment film in the frame region, i.e., the alignment state of the liquid crystal molecules in the frame region. So the alignment state of the liquid crystal molecules in the display region, i.e., practical display mode is not especially limited. It may be TN (Twisted Nematic) mode, ECB (Electrically Controlled Birefringence) mode, VAECB mode, HAN (Hybrid-aligned Nematic) mode, alignment division mode thereof, IPS (In-plane switching) mode, in addition to the 4VATN mode.

The present application claims priority to Patent Application No. 2007-245732 filed in Japan on Sep. 21, 2007 under the Paris Convention and provisions of national law in a designated State, the entire contents of which are hereby incorporated by reference.

BRIEF DESCRIPTION OF DRAWINGS

FIG. 9(a) is a plan view thereof.

FIG. 9(b) is a side view thereof.

FIG. 11(a) is a plan view thereof.

FIG. 11(b) is a side view thereof.

FIG. 12(a) is a plan view thereof.

FIG. 12(b) is a side view thereof.

FIG. 13(a) is a plan view thereof.

FIG. 13(b) is a side view thereof.

Figure 1:
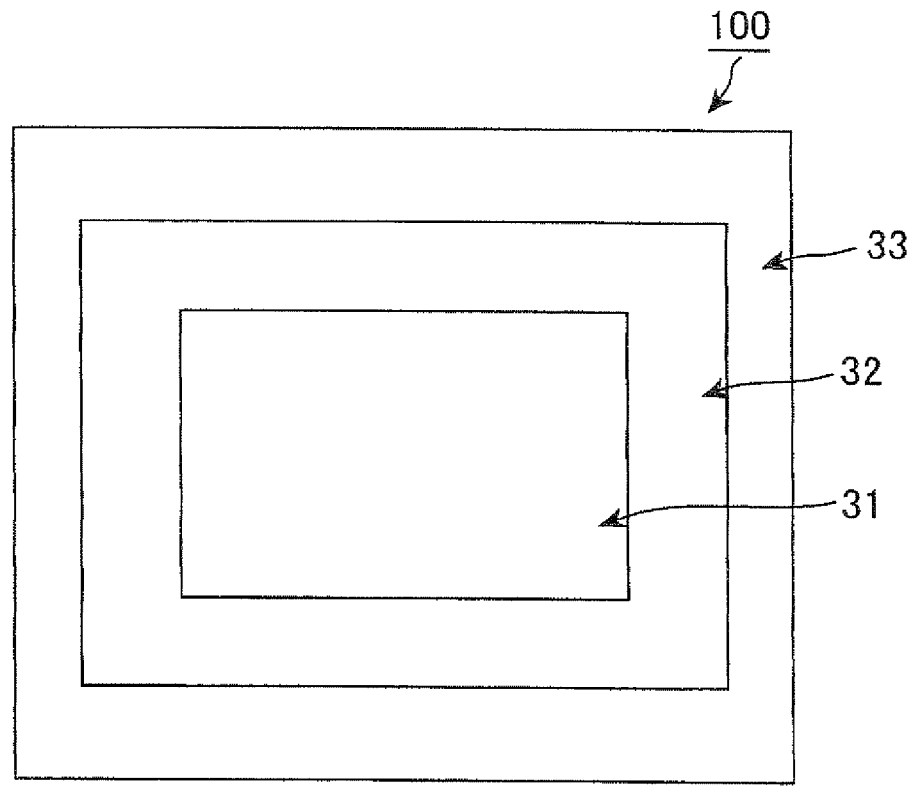
FIG. 1 is a plan view schematically showing a liquid crystal display device of Embodiment 1.
Figure 2:
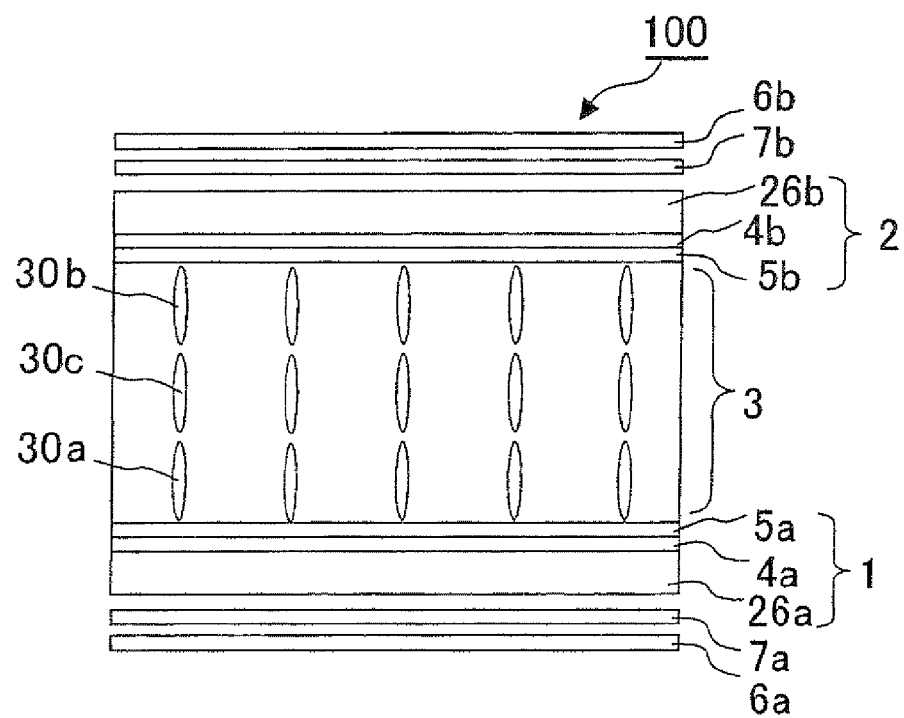
FIG. 2 is a cross-sectional view schematically showing a configuration of the display region of the liquid crystal display panel of Embodiment 1.
Figure 3:
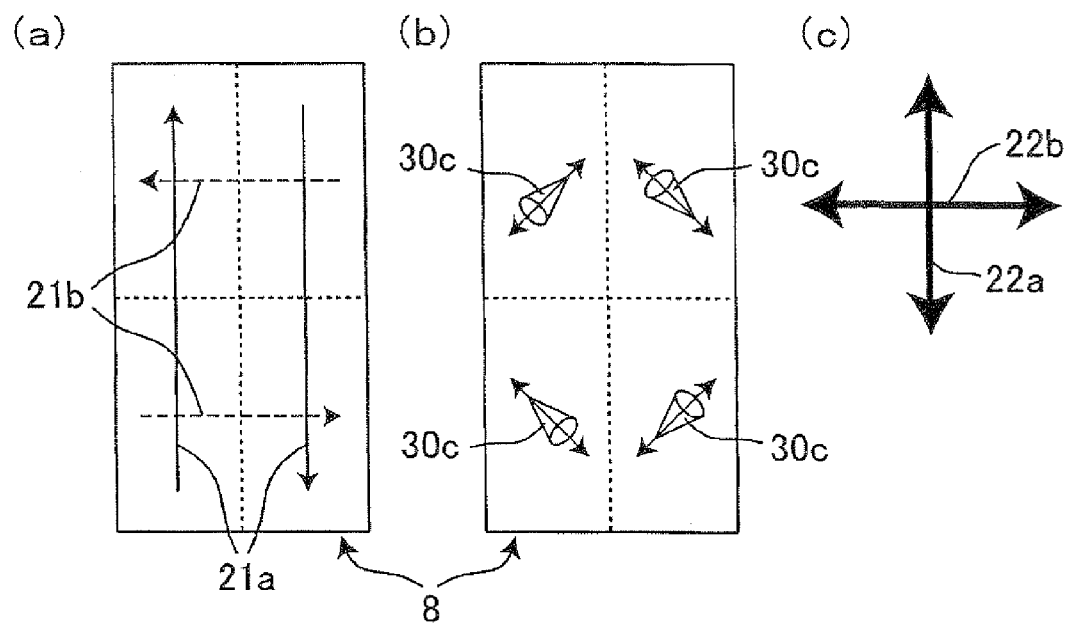
FIG. 3(a) is a plan view schematically showing alignment directions of the alignment films in each picture element in the display region of the liquid crystal display device of Embodiment 1.
FIG. 3(b) is a plan view schematically showing alignment directions of the liquid crystal molecules at almost the center of the thickness direction of the liquid crystal layer in each picture element in the display region at ON-state of the liquid crystal display device of Embodiment 1.
FIG. 3(c) is a schematic view showing polarization axis directions of the polarization plates in the liquid crystal display device of Embodiment 1.
Figure 4:
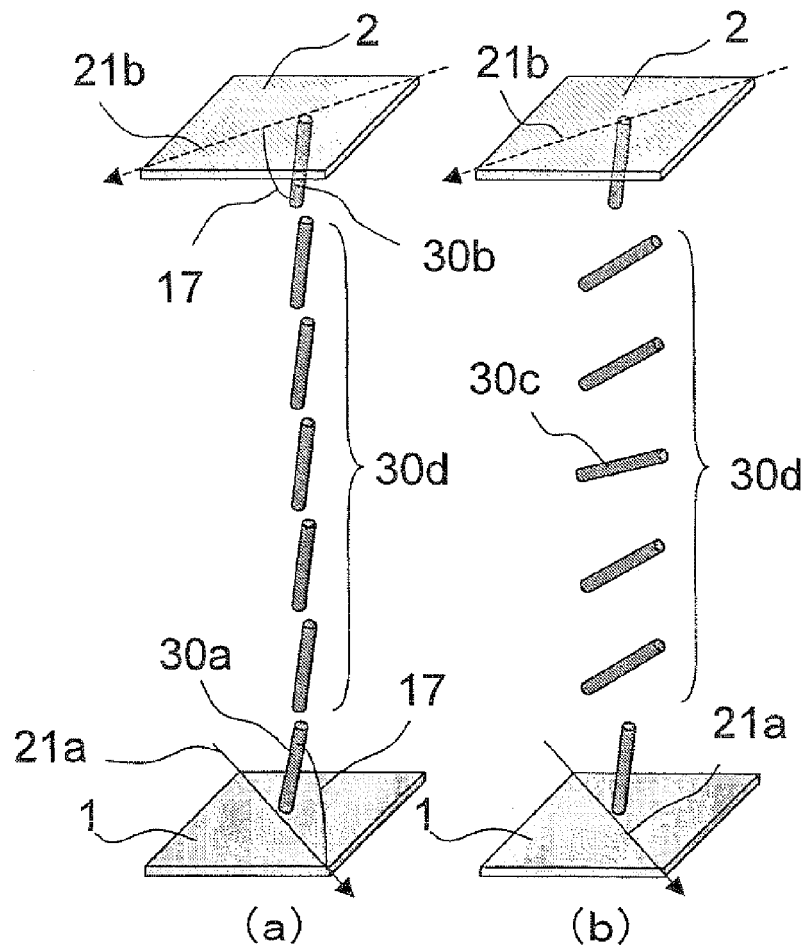
FIG. 4(a) is a perspective view schematically showing an alignment state of the liquid crystal molecules in the display region at OFF-state in the liquid crystal display device of Embodiment 1.
FIG. 4(b) is a perspective view schematically showing an alignment state of the liquid crystal molecules in the display region at ON-state in the liquid crystal display device of Embodiment 1.
Figure 5:
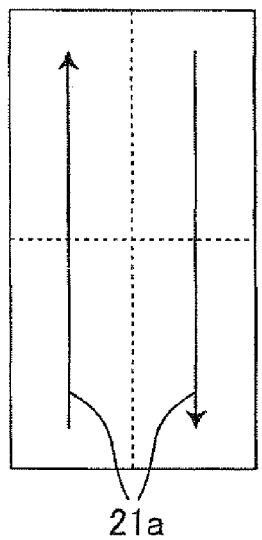
FIG. 5(a) is a plan view schematically showing alignment directions of the alignment film in each picture element in the frame region of the liquid crystal display device of Embodiment 1.
FIG. 5(b) is a plan view schematically showing alignment directions of the liquid crystal molecules near the active matrix substrate in each picture element in the frame region at ON-state of the liquid crystal display device of Embodiment 1.
FIG. 5(c) is a schematic view showing polarization axis directions of the polarization plates in the liquid crystal display device of Embodiment 1.
Figure 5:
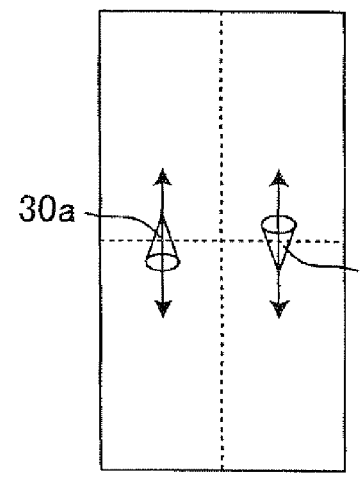
Figure 5:
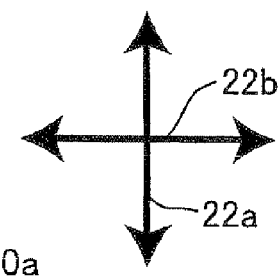
Figure 6:
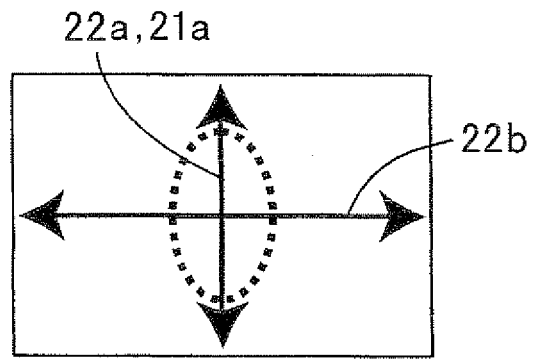
FIG. 6 is a schematic view showing: the polarization axis directions of the polarization plates and the alignment directions of the vertical alignment films; and the alignment state of a liquid crystal molecule positioned on the counter substrate side in the frame region at ON-state in the liquid crystal display device of Embodiment 1.
Figure 7:
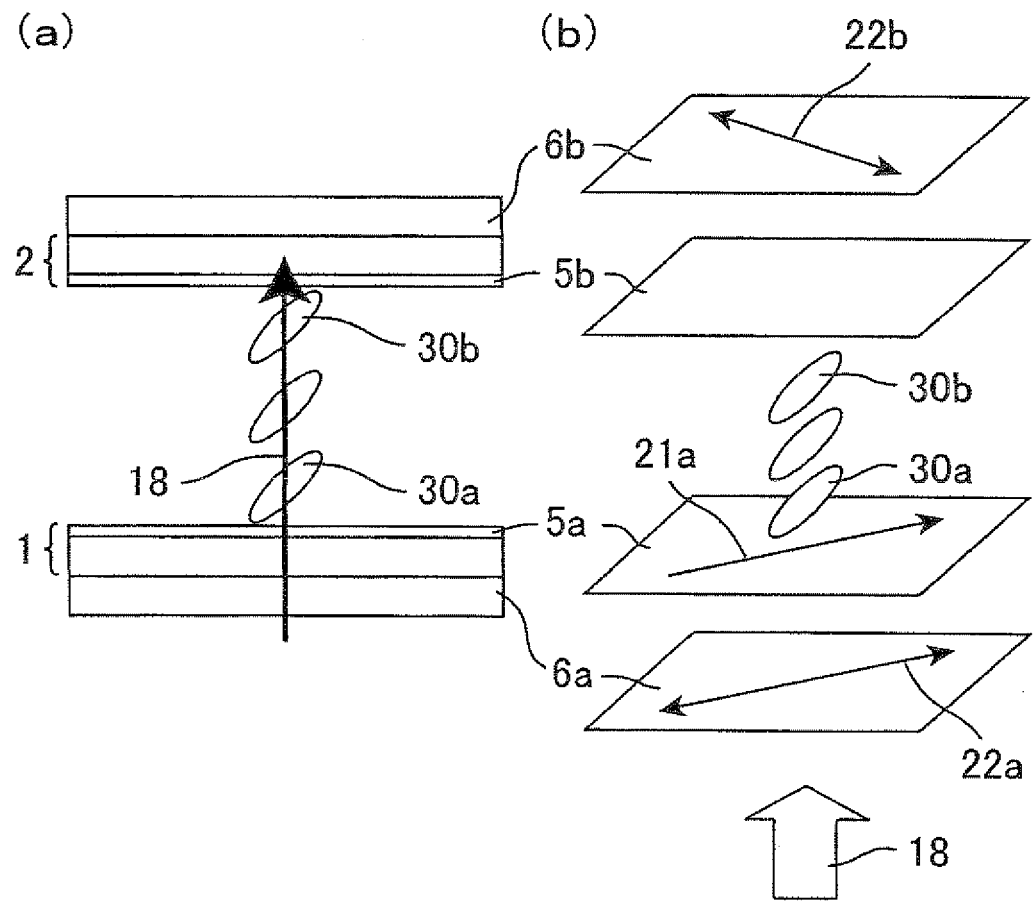
FIG. 7(a) is a cross-sectional view schematically showing a configuration in the frame region at ON-state in the liquid crystal display device of Embodiment 1.
FIG. 7(b) is a perspective view thereof.
Figure 8:
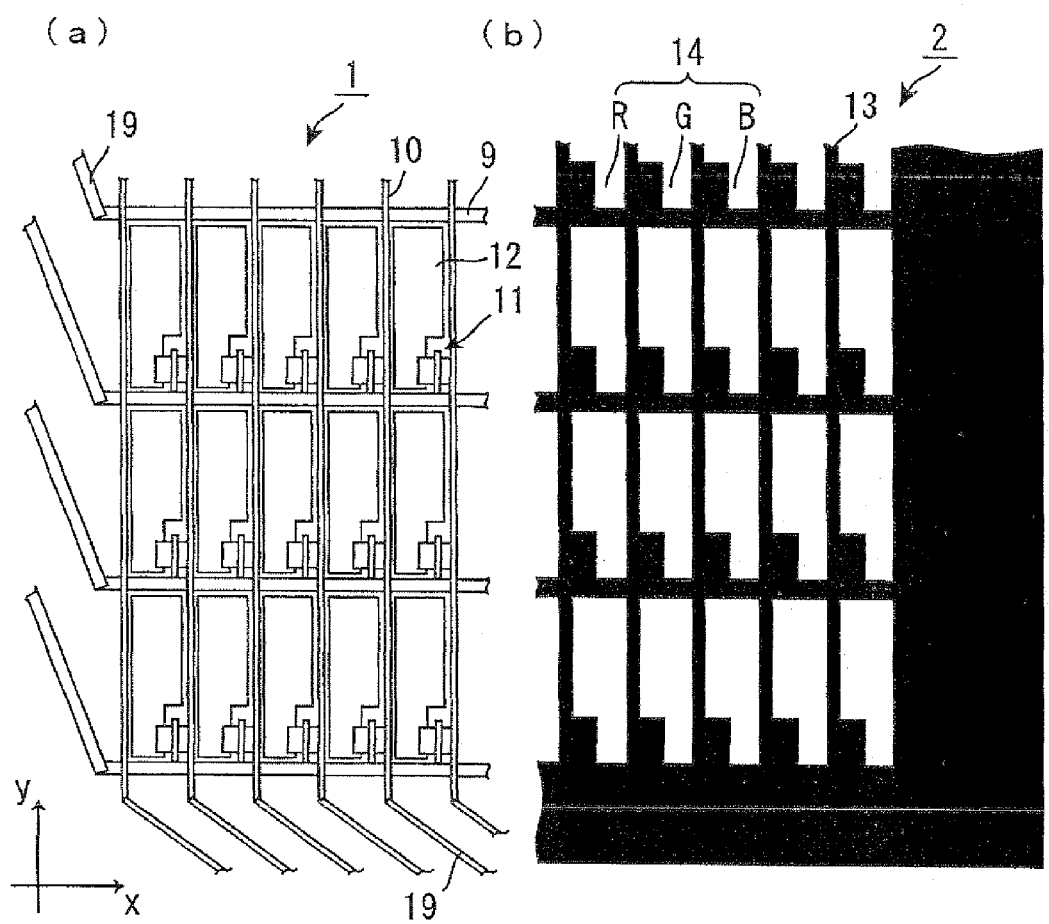
FIG. 8(a) is a plan view schematically showing an active matrix substrate of Embodiment 1.
FIG. 8(b) is a plan view schematically showing a counter substrate of Embodiment 1.
Figure 9:
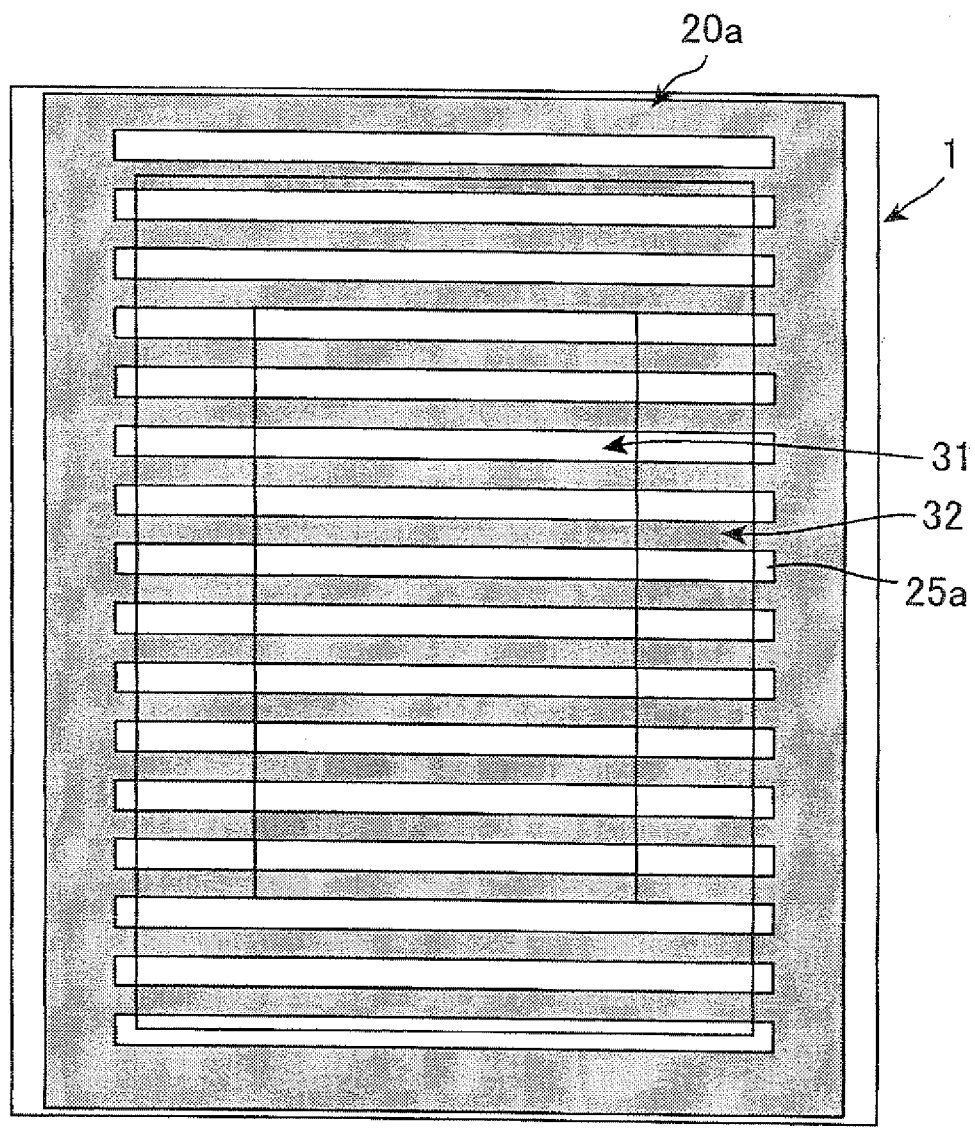
FIG. 9 is a schematic view showing an embodiment of the 1st shot exposure for an alignment film (active matrix substrate) of Embodiment 1.
Figure 9:
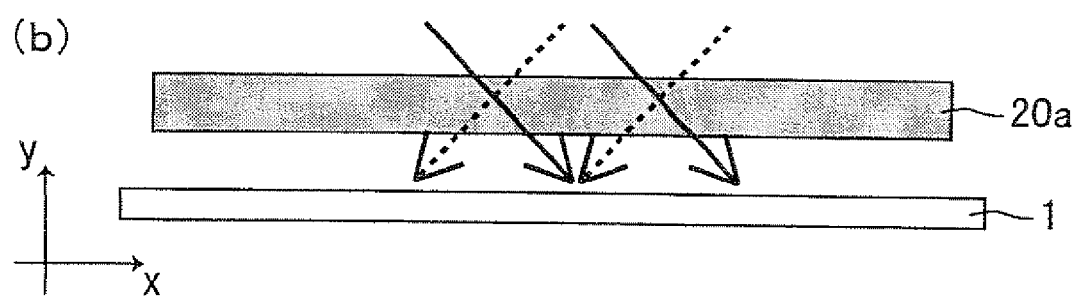
Figure 10:
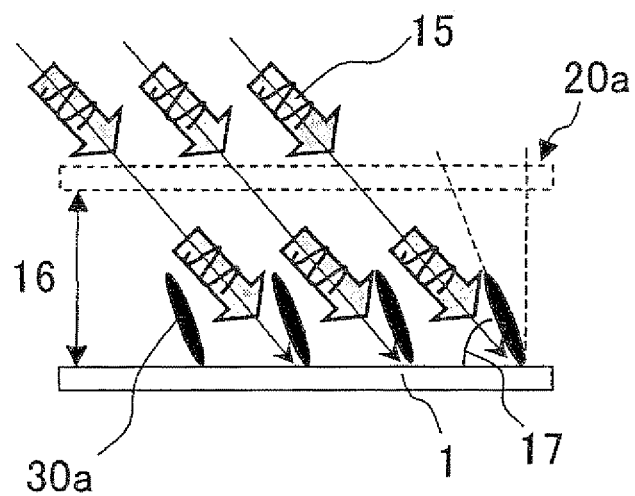
FIG. 10 is a cross-sectional view schematically showing an embodiment of photo-irradiation to the active matrix substrate in the exposure step of Embodiment 1.
Figure 11:
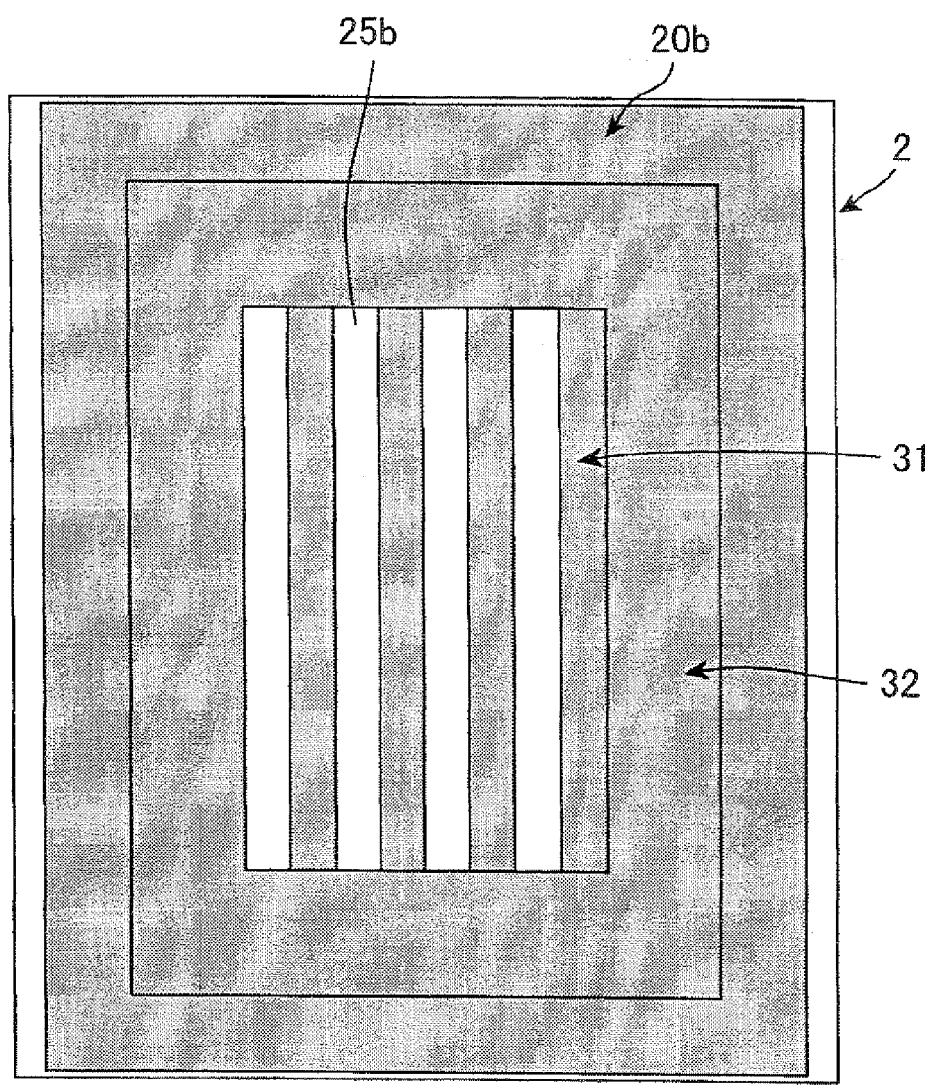
FIG. 11 is a schematic view showing an embodiment of the 1st shot exposure for an alignment film (counter substrate) of Embodiment 1.
Figure 11:
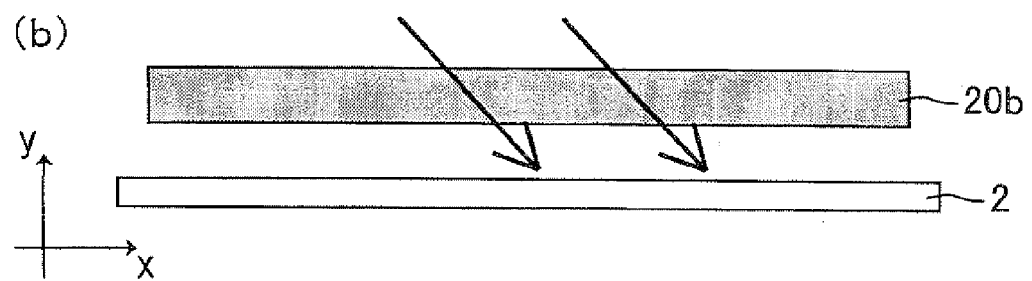
Figure 12:
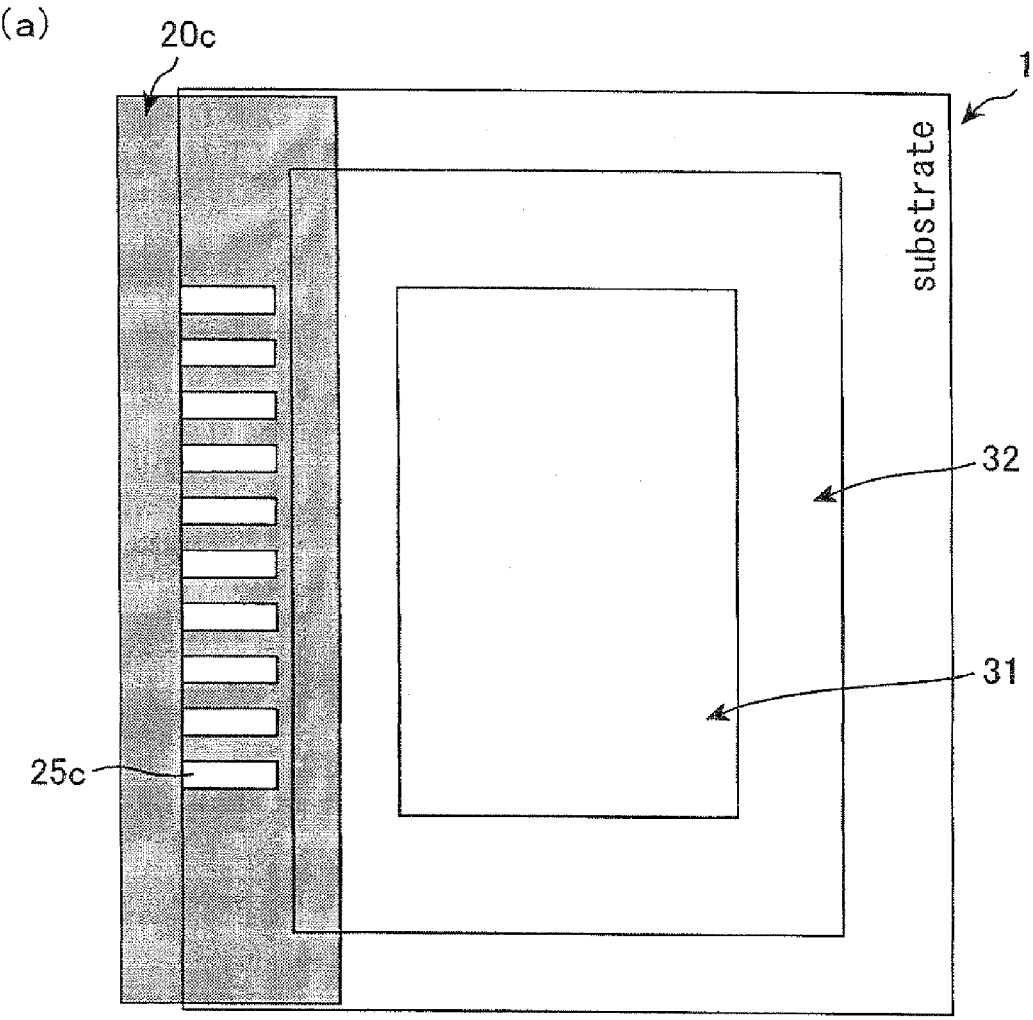
FIG. 12 is a schematic view showing an embodiment of the 1st scan exposure to an alignment film (active matrix substrate) of Embodiment 1.
Figure 12:
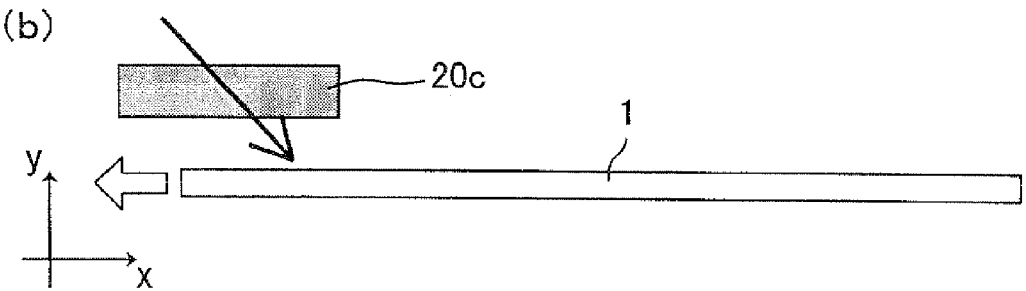
Figure 13:
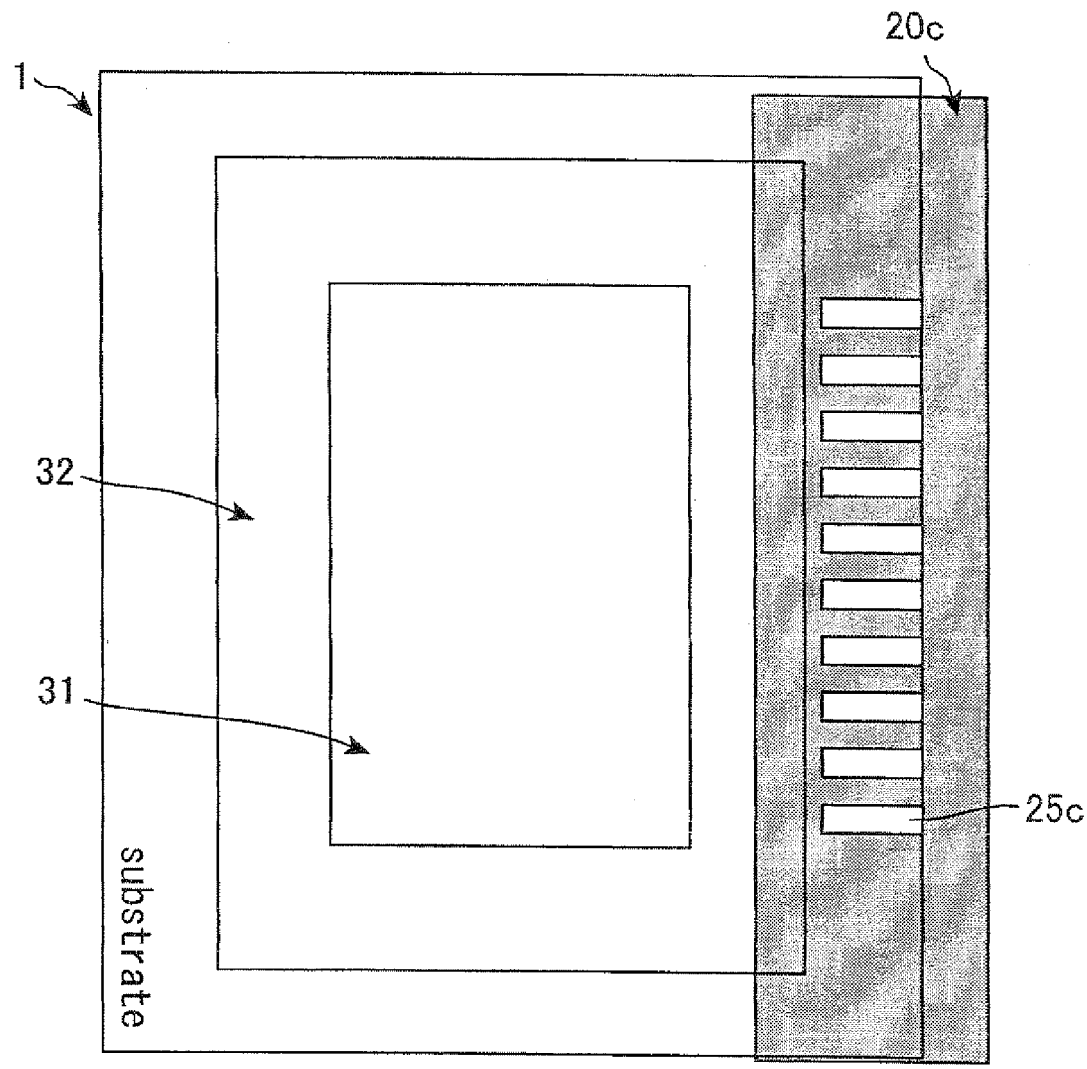
FIG. 13 is a schematic view showing an embodiment of the 2nd scan exposure to the alignment film (the active matrix substrate) of Embodiment 1.
Figure 13:
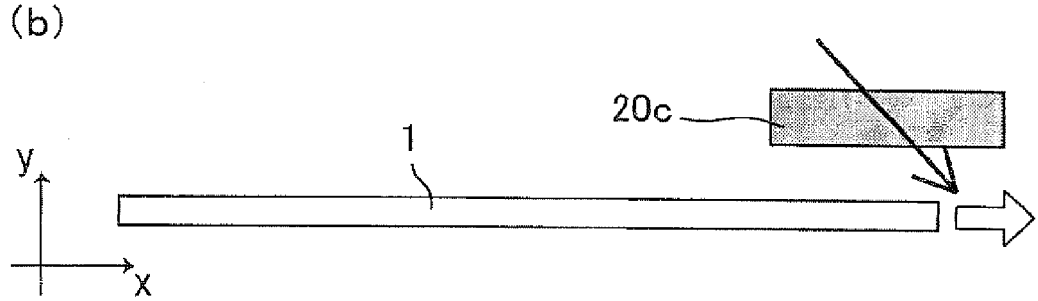
Figure 14:
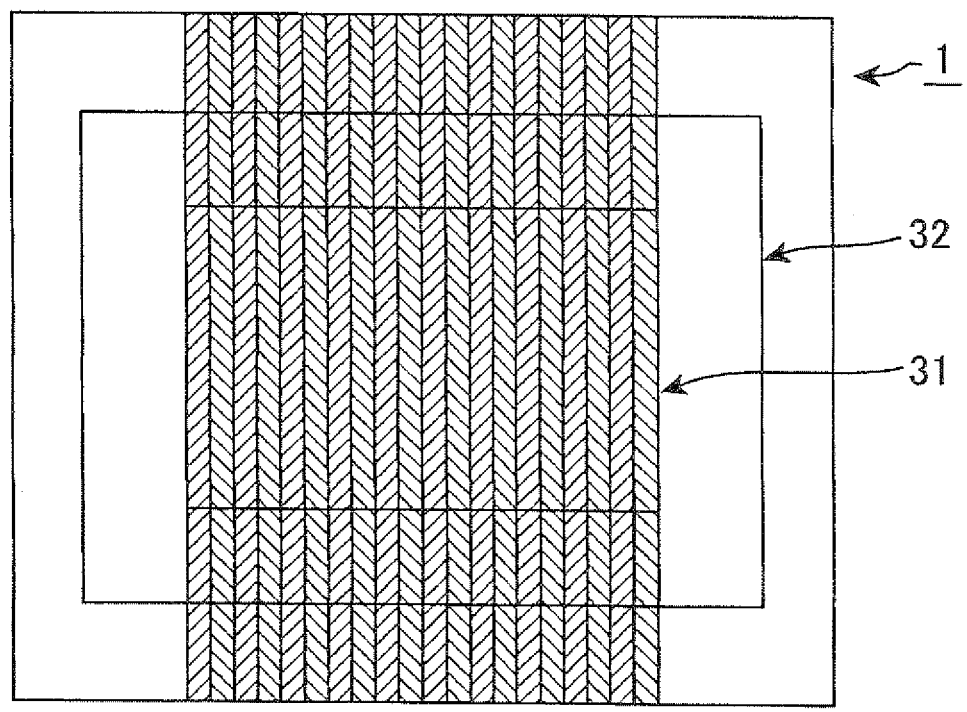
FIG. 14 is a plan view schematically showing the active matrix substrate that has been provided with an alignment treatment by scan exposure of Embodiment 1.
Figure 15:
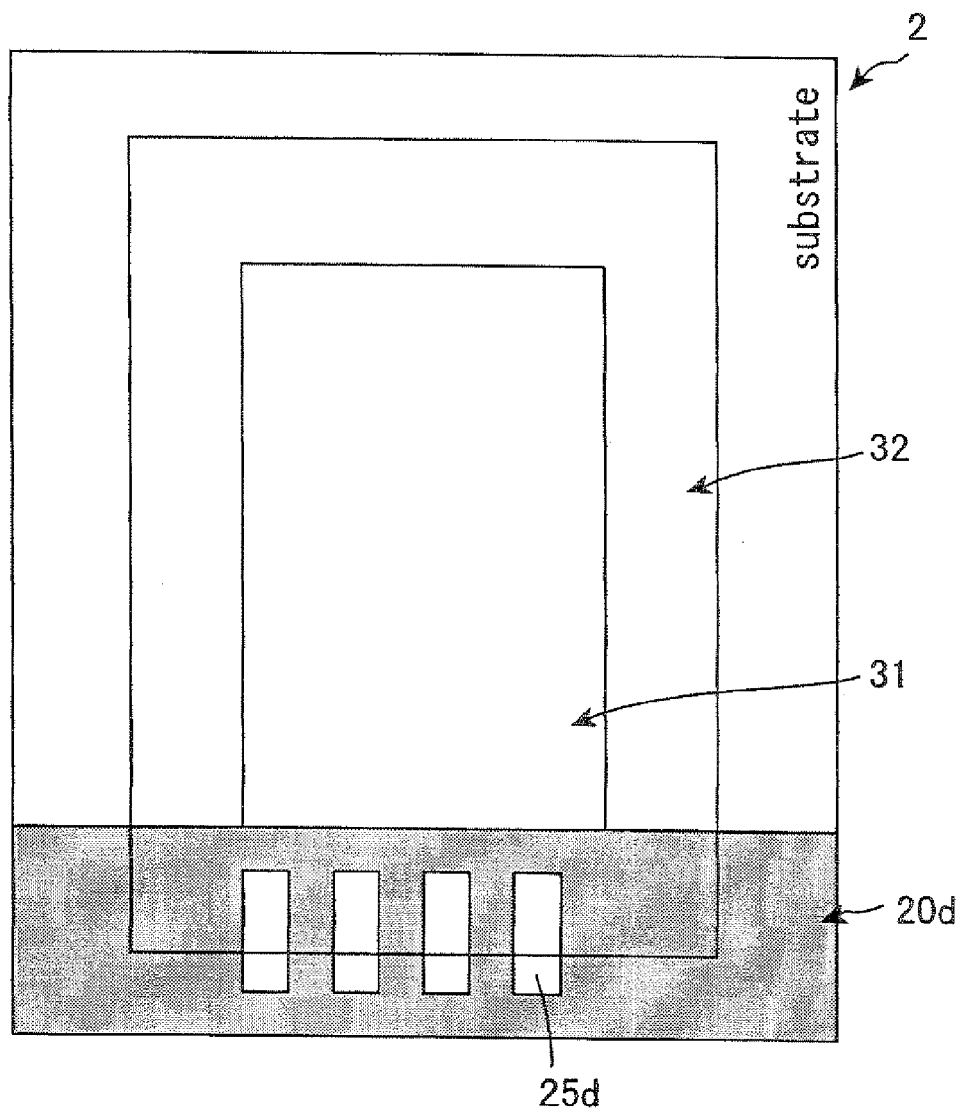
FIG. 15 is a schematic view showing an embodiment of the 1st shot exposure to an alignment film (counter substrate) of Embodiment 1.
Figure 16:
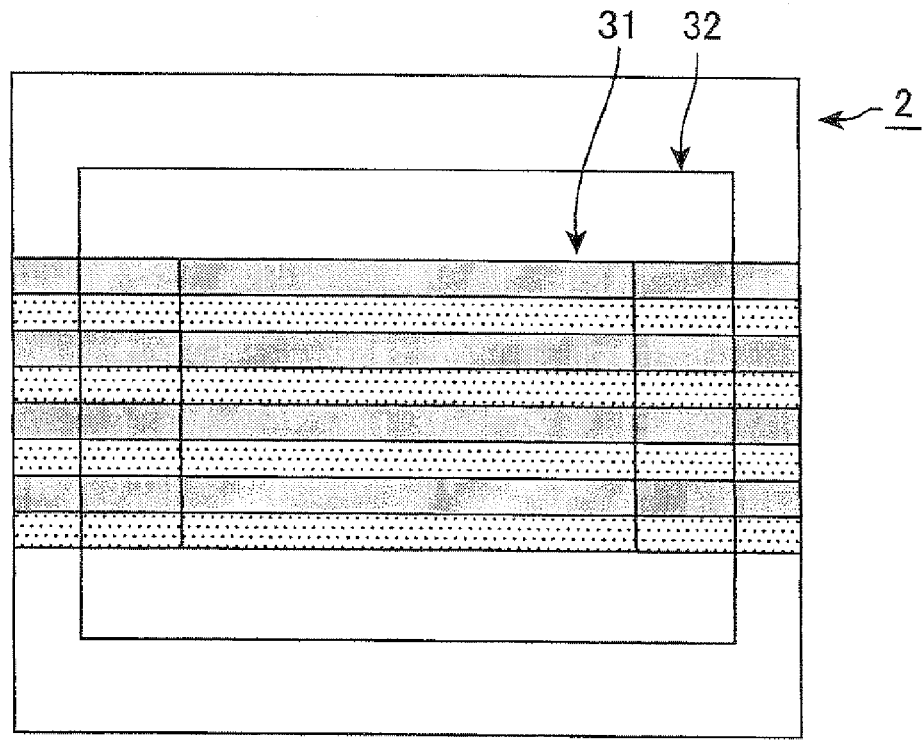
FIG. 16 is a plan view schematically showing a counter substrate that has been provided with an alignment treatment by scan exposure of Embodiment 1.
Figure 17:
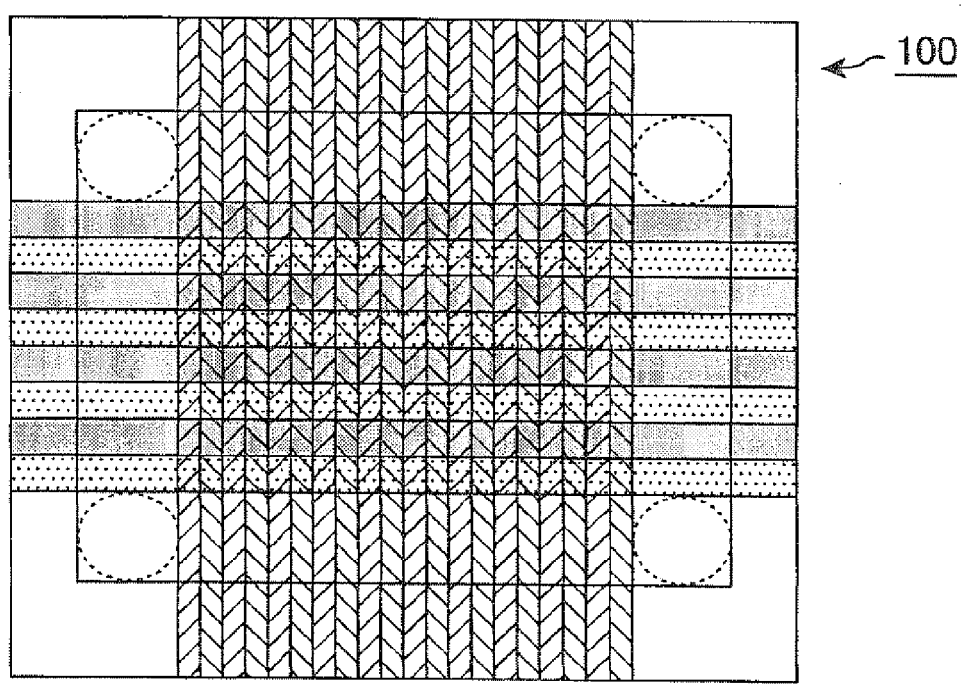
FIG. 17 is a plan view schematically showing the liquid crystal display panel that has been provided with an alignment treatment by scan exposure of Embodiment 1.
Figure 18:
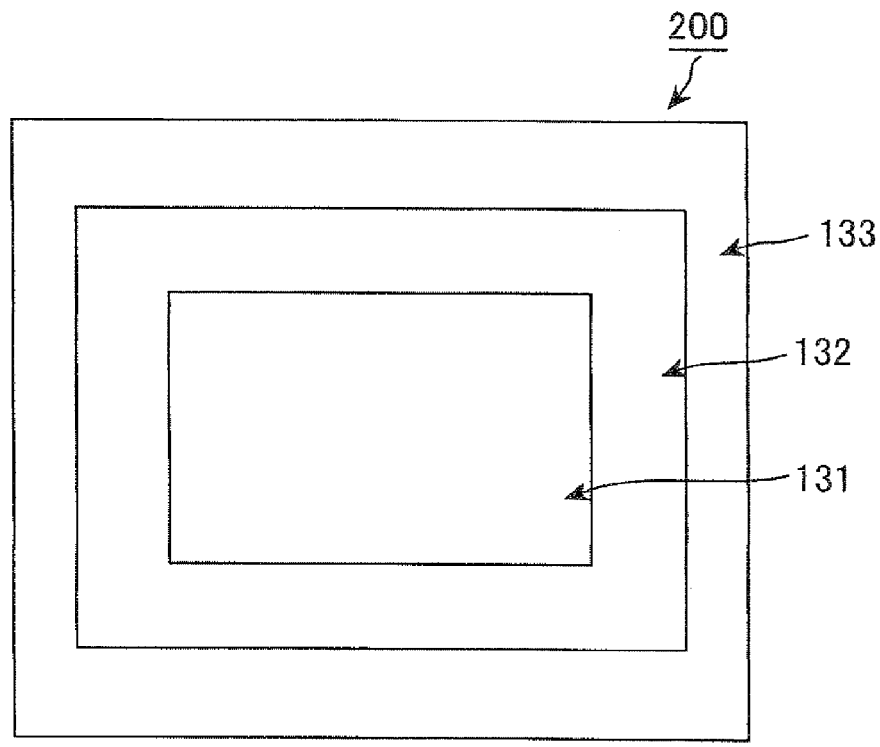
FIG. 18 is a plan view schematically showing a conventional liquid crystal display panel.
Figure 19:
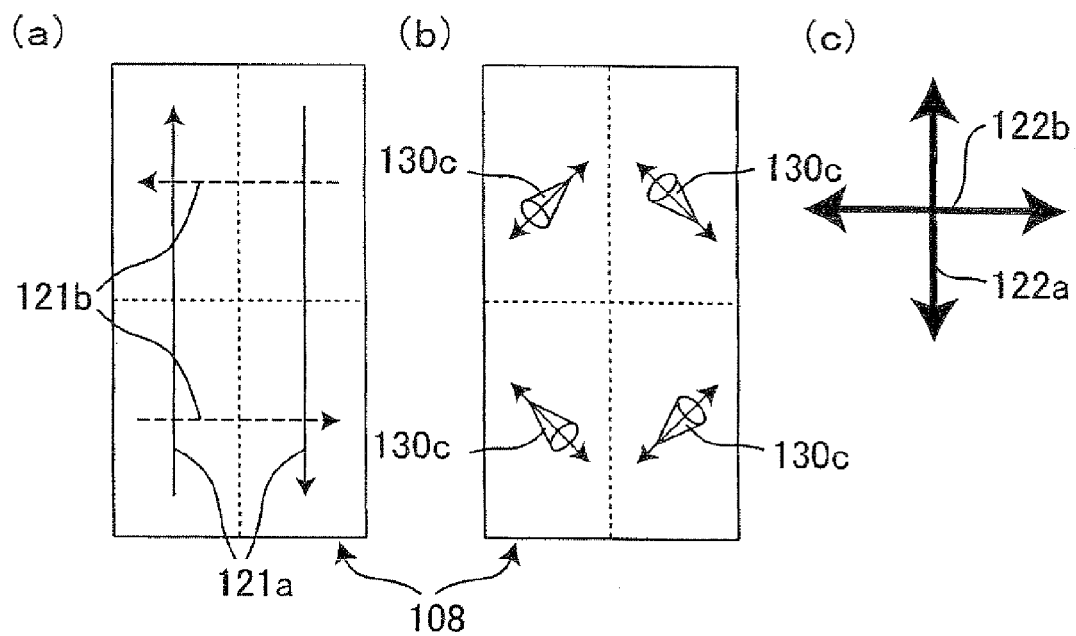
FIG. 19(a) is a plan view schematically showing alignment directions of alignment films in each picture element in a display region of the conventional liquid crystal display device.
FIG. 19(b) is a plan view schematically showing alignment directions of liquid crystal molecules at almost the center of the thickness direction of a liquid crystal layer in each picture element in the display region of the conventional liquid crystal display device at ON-state.
FIG. 19(c) is a schematic view showing polarization axis directions of polarization plates in the conventional liquid crystal display device.
Figure 20:
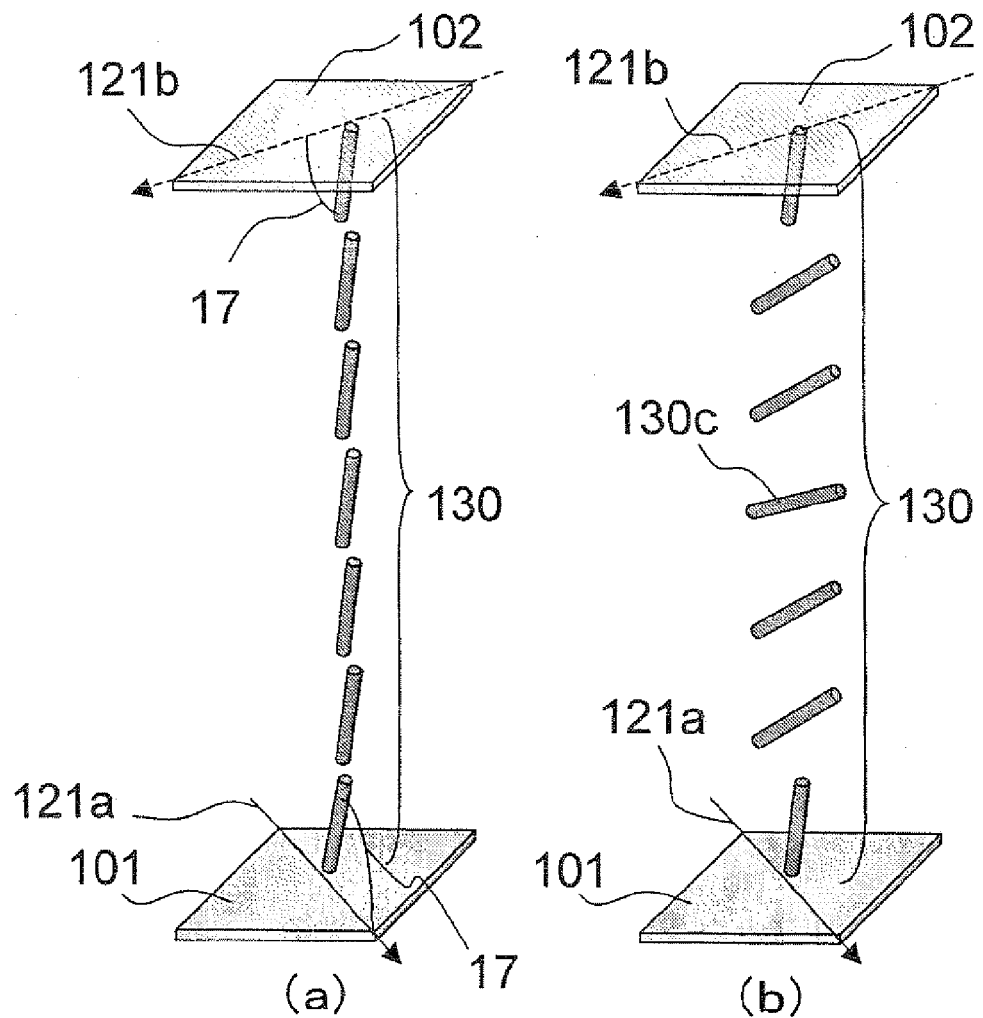
FIGS. 20(a) and 20(b) are perspective views each schematically showing aligning liquid crystal molecules at OFF-state and ON-state, respectively, in the display region of the conventional liquid crystal display device.
Figure 21:
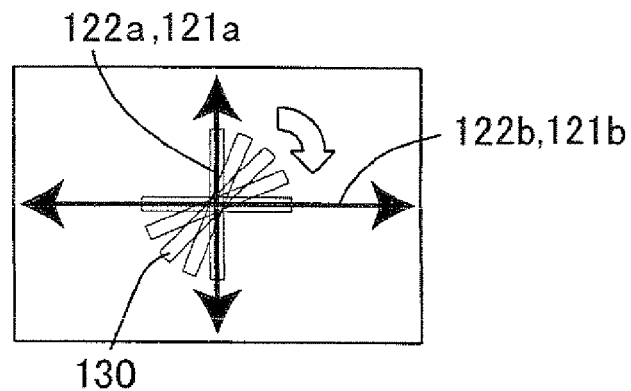
FIG. 21 is a schematic view showing: the polarization axis directions of the polarizing plates and the alignment directions of the vertical alignment films; and the aligning liquid crystal molecule state at ON-state in the conventional liquid crystal display device.
Figure 22:
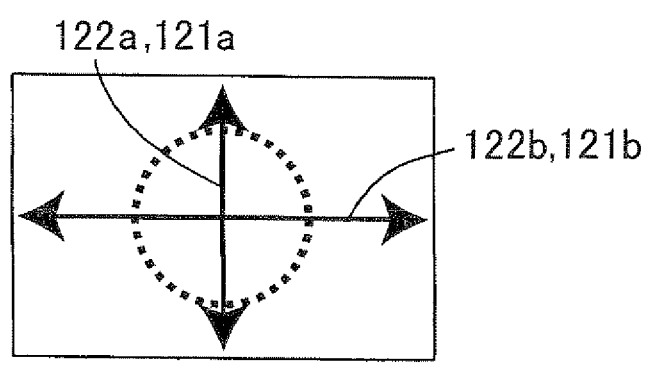
FIG. 22 is another view schematically showing the same as in FIG. 21.

EXPLANATION OF NUMERALS AND SYMBOLS 1, 101: Active matrix substrate
2, 102: Counter substrate
3: Liquid crystal layer
4a, 4b: Transparent electrode
5a, 5b: Alignment film
6a, 6b: Polarizing plate
7a, 7b: Retardation plate
8, 108: Picture element
9: Scanning signal line
10: Data signal line
11: TFT
12: Pixel electrode
13: Black matrix (BM)
14: Color filter
15: Light beam (Polarized UV light)
16: Proximity gap
17: Pretilt angle
18: Light
19: Drawing wiring
20a, 20b, 20c, 20d: Photomask
21a, 21b, 121a, 121b: Alignment treatment direction
22a, 22b, 122a, 122b: Polarization axis direction
25a, 25b, 25c, 25d: Slit
26a, 26b: Insulating substrate
30, 30a, 30b, 30c, 30d, 130, 130c: Liquid crystal molecule
31, 131: Display region
32, 132: Frame region
33, 133: Terminal region
100, 200: Liquid crystal display panel
R: Red colored layer
G: Blue colored layer
B: Green colored layer

The invention claimed is:

1. A liquid crystal display device comprising:
first and second substrates facing each other;
a liquid crystal layer arranged between the first and second substrates;
first and second alignment films arranged on liquid crystal layer side-surfaces of the first and second substrates, respectively; and
first and second polarization plates,
the first polarization plate being arranged on a side opposite to the liquid crystal layer side of the first substrate,
the second polarization plate being arranged on a side opposite to the liquid crystal layer side of the second substrate,
wherein the first alignment film has an alignment portion in a frame region,
an alignment direction of the alignment portion being in accordance with a polarization axis direction of the first polarization plate,
the second alignment film has a non-alignment portion for which an alignment treatment is not provided,
the non-alignment portion of the second alignment film is positioned in a region corresponding to the alignment portion of the first alignment film,
wherein a portion of the second alignment film, corresponding to the alignment portion of the first alignment film, is not provided with the alignment treatment,
wherein the first and second polarization plates are arranged in cross-Nicol,
wherein the first and second alignment films are vertical alignment films, and the liquid crystal layer contains a nematic liquid crystal material with negative dielectric anisotropy,
wherein the frame region is located between a display region and a terminal region,
wherein at least one of the first and second substrates includes a drawing wiring; and
wherein the drawing wiring is overlapped with the alignment portion of the first alignment film and the non-alignment portion of the second alignment film in the frame region.

2. The liquid crystal display device according to claim 1, wherein the first alignment film is arranged on a back side.

3. The liquid crystal display device according to claim 1,
wherein at least one of the first and second substrates includes a drawing wiring in the frame region, and
the alignment portion of the first alignment film corresponds to the drawing wiring-including region.

4. The liquid crystal display device according to claim 1,
wherein at least the first substrate includes a drawing wiring in the frame region, and
the alignment portion of the first alignment film corresponds to the drawing wiring-including region.

5. The liquid crystal display device according to claim 1, wherein the alignment direction of the alignment portion is substantially the same as that of a display region-portion of the first alignment film.

6. The liquid crystal display device according to claim 1, wherein the pair of first and second alignment films are photo-alignment films.

7. A production method of a liquid crystal display device including:
first and second substrates facing each other; a liquid crystal layer arranged between the first and second substrates; first and second alignment films arranged on liquid crystal layer side-surfaces of the first and second substrates, respectively; and
first and second polarization plates,
the first polarization plate being arranged on a side opposite to the liquid crystal layer side of the first substrate,
the second polarization plate being arranged on a side opposite to the liquid crystal layer side of the second substrate,
the production method comprising:
an alignment treatment step of providing the first alignment film with an alignment treatment in a direction in accordance with a polarization axis direction of the first polarization plate, thereby providing the first alignment film with an alignment portion in a frame region;
an attachment step of attaching the first substrate having undergone the alignment treatment in the alignment treatment step to the second substrate,
wherein the second alignment film has a non-alignment portion for which an alignment treatment has not been provided,
the non-alignment portion of the second alignment film is positioned in a region corresponding to the alignment portion of the first alignment film, wherein a portion of the second alignment film, corresponding to the alignment portion of the first alignment film, has not been provided with the alignment treatment, wherein the first and second polarization plates are arranged in cross-Nicol, wherein the first and second alignment films are vertical alignment films, and the liquid crystal layer contains a nematic liquid crystal material with negative dielectric anisotropy, wherein the frame region is located between a display region and a terminal region, wherein at least one of the first and second substrates includes a drawing wiring; and wherein the drawing wiring is overlapped with the alignment portion of the first alignment film and the non-alignment portion of the second alignment film in the frame region.

8. The production method according to claim 7, wherein the first alignment film is arranged on a back side.

9. The production method according to claim 7, wherein at least one of the first and second substrates includes a drawing wiring in the frame region, and in the alignment treatment step, the first alignment film is provided with the alignment treatment so that the alignment portion corresponds to the drawing wiring-including region.

10. The production method according to claim 7, wherein at least the first substrate includes a drawing wiring in the frame region, and in the alignment treatment step, the first alignment film is provided with the alignment treatment so that the alignment portion corresponds to the drawing wiring-including region.

11. The production method according to claim 7, wherein in the alignment treatment step, the alignment portion and a display region-portion of the first alignment film are simultaneously or successively provided with the alignment treatment.

12. The production method according to claim 7, wherein the first and second alignment films are photo-alignment films, and in the alignment treatment step, the photo-alignment films are exposed.

* * * * *